US012530471B2

(12) United States Patent
Jeanson

(10) Patent No.: US 12,530,471 B2
(45) Date of Patent: Jan. 20, 2026

(54) LOCAL/HYBRID BLOCKCHAIN FOR OIL AND GAS OPERATIONS INTEGRITY

(71) Applicant: Schlumberger Technology Corporation, Sugar Land, TX (US)

(72) Inventor: Eric Jeanson, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 98 days.

(21) Appl. No.: 18/654,972

(22) Filed: May 3, 2024

(65) Prior Publication Data

US 2024/0289468 A1 Aug. 29, 2024

Related U.S. Application Data

(63) Continuation of application No. 17/594,098, filed as application No. PCT/US2020/026432 on Apr. 2, 2020, now Pat. No. 11,977,645.

(60) Provisional application No. 62/828,974, filed on Apr. 3, 2019.

(51) Int. Cl.
| | |
|---|---|
| *G06F 21/00* | (2013.01) |
| *G06F 16/23* | (2019.01) |
| *G06F 21/60* | (2013.01) |
| *G06Q 10/063* | (2023.01) |

(52) U.S. Cl.
CPC ........ *G06F 21/602* (2013.01); *G06F 16/2365* (2019.01); *G06F 16/2379* (2019.01); *G06Q 10/063* (2013.01)

(58) Field of Classification Search
CPC .............. G06F 21/602; G06F 16/2365; G06F 16/2379; G06Q 10/063; G06Q 50/02; H04L 67/025; H04L 67/10
See application file for complete search history.

(56) References Cited

U.S. PATENT DOCUMENTS

| | | |
|---|---|---|
| 2016/0284033 A1 | 9/2016 | Winand |
| 2017/0103468 A1 | 4/2017 | Orsini |
| 2017/0358041 A1 | 12/2017 | Forbes, Jr. |

(Continued)

FOREIGN PATENT DOCUMENTS

| | | |
|---|---|---|
| KR | 10-20170137388 | 12/2017 |
| KR | 10-20180065410 | 6/2018 |
| WO | 2018223042 A1 | 12/2018 |

OTHER PUBLICATIONS

Košt'ál, Kristián, et al. "Management and monitoring of IoT devices using blockchain." Sensors 19.4 (2019): 856. (Year: 2019).*

(Continued)

*Primary Examiner* — Ka Shan Choy
(74) *Attorney, Agent, or Firm* — Jeffrey D. Frantz

(57) ABSTRACT

Methods and systems for blockchain-related systems for oil and gas infrastructure are disclosed. In one aspect, a blockchain-related system includes a node disposed at an oil or gas infrastructure site, the node including a memory configured to store blockchain data; and a processor configured to: receive a first data item to append to a blockchain; add the first data item to the blockchain; but when communication to a second node is not available, the blockchain-related system may split the blockchain and add the first data item to the split blockchain.

20 Claims, 22 Drawing Sheets

(56) References Cited

U.S. PATENT DOCUMENTS

| | | | | |
|---|---|---|---|---|
| 2018/0365106 | A1* | 12/2018 | Huang | G06F 11/2097 |
| 2019/0033845 | A1 | 1/2019 | Cella | |
| 2019/0268138 | A1 | 8/2019 | Mankovskii | |
| 2019/0312928 | A1* | 10/2019 | D'Ercoli | H04L 67/1095 |
| 2020/0134066 | A1* | 4/2020 | Yegorin | H04L 9/0637 |
| 2020/0175503 | A1* | 6/2020 | Sarin | G06F 21/64 |
| 2020/0175590 | A1* | 6/2020 | Huo | H04L 9/50 |
| 2021/0073212 | A1 | 3/2021 | Conley | |

OTHER PUBLICATIONS

Merlinda Andoni et al. Blockchain technology in the energy sector: A systematic review of challenges and opportunities. Renewable and Sustainable Energy Reviews, vol. 100, Feb. 2019.

Wang, W. et al., "A Survey on Consensus Mechanisms and Mining Strategy Management in Blockchain Networks", IEEE Access, 2019, vol. 7, Section D: Consensus in Blockchain Networks, pp. 6-8, Section C: Hybrid Consensus Protocol, pp. 25-27, Section B: Sharding for scale-out Throughput and Section C: Nonlinear Block organization, pp. 29-32, Section 2: Self Organization and Security Enhancement Under Various Network Architectures, pp. 34-35.

Ren, Y. et al., "Secure data storage based on blockchain and coding in edge computing", Mathematical Biosciences and Engineering, 2019, 16(4), Retrieved from the Internet: [URL:http://www.aimspress.com/fileOther/PDF/MBE/mbe-16-04-091.pdf>], Section 4: Data security storage mechanism based on blockchain, pp. 7-16.

Extended Search Report issued in European Patent Application No. 20784942.3 dated Nov. 30, 2022, 14 pages.

International Search Report and Written Opinion for the Equivalent PCT/US20/026432 dated Jul. 17, 2020 (16 Pages).

International Preliminary Report on Patentability of International Patent Application No. PCT/US2020/026432 dated Oct. 14, 2021, 9 pages.

\* cited by examiner

LOCAL/HYBRID BLOCKCHAIN FOR OIL AND GAS OPERATIONS INTEGRITY

CROSS REFERENCE PARAGRAPH

This application is a continuation of U.S. patent application Ser. No. 17/594,098, filed on Oct. 1, 2021, which claims benefit of PCT Application No. PCT/US2020/026432, filed on Apr. 2, 2020, which claims the benefit of U.S. Provisional Application No. 62/828,974, filed Apr. 3, 2019, the disclosure of which are hereby incorporated herein by reference in their entirety.

BACKGROUND

Oilfield operations are complex and involve systems as well as operators collaborating to accomplish the desired outcome. In many cases the oilfield operations and other energy generation, capture, and transmission environments are conducted in remote environment, which impacts the ability to be always connected to a stable, reliable or deterministic network.

It would be desirable to use blockchain technology in the oilfield industry and other energy generation, capture, and transmission environments in the field and in town to provide built-in trust in audit trails and activity ledgers in a way it was not possible in the past. For example, a blockchain may provide tamper proof records that cannot be altered once created and can be validated via a set of distributed nodes on a network.

However, available blockchain technology today operates on a wide area network with nodes distributed around the world. Nodes may be contacted by block requesters to create new entries in the blockchain, for which nodes coordinate themselves to create a unique and un-alterable new block. That chain can protect information such financial record of transactions.

At an oilfield operation site such as a wellsite, a rig site, other oilfield facility-as well as in other energy generation, capture, and transmission environments-connectivity such as to the Internet or private networks may be intermittent, absent, or limited in data rate or latency. It has not been possible to deploy and operate a blockchain system when the reliance on connectivity to distributed wide area network and/or cloud access is questionable, particularly when high transaction rates that oil field systems can generate cannot be throttled beyond the wellsite due to lack of performant connectivity.

Therefore, a local/hybrid blockchain system and method for oil and gas and other energy generation, capture, and transmission environments to improve operational integrity would be desirable.

SUMMARY

According to some embodiments, a method is provided for protecting winch conveyance data using blockchain, wherein the winch conveyance location includes site computing infrastructure, the method comprising at a computing infrastructure that includes one or more blockchain nodes: receiving a first data item from the site computing infrastructure; and at a first blockchain node in the one or more blockchain nodes: updating a first blockchain ledger to include the first data item to create a first updated blockchain ledger; when the site computing infrastructure is available, sending the first updated blockchain ledger to the site computing infrastructure; when the site computing infrastructure is unavailable, maintaining the first updated blockchain ledger as a first split branch; and after determining that the site computing infrastructure is unavailable, and in response to receiving a second data item from the site computing infrastructure: reconciling the first split branch and the second data item to generate a second updated blockchain ledger; and sending the second updated blockchain ledger to the site computing infrastructure. In additional embodiments, at least a plurality of the blockchain nodes in the computing infrastructure is disposed in a remote cloud-based infrastructure, and in response to receiving the first data item for processing, using a plurality of the remote blockchain nodes to update the first blockchain ledger. In additional embodiments, the first updated blockchain ledger is audited. In additional embodiments, updating the first blockchain ledger includes performing a cryptography operation.

According to some embodiments, a method is provided for protecting drilling operations data using blockchain, wherein the drilling operations location includes site computing infrastructure, the method comprising at a computing infrastructure that includes one or more blockchain nodes: receiving a first data item from the site computing infrastructure; and at a first blockchain node in the one or more blockchain nodes: updating a first blockchain ledger to include the first data item to create a first updated blockchain ledger; when the site computing infrastructure is available, sending the first updated blockchain ledger to the site computing infrastructure; when the site computing infrastructure is unavailable, maintaining the first updated blockchain ledger as a first split branch; and after determining that the site computing infrastructure is unavailable, and in response to receiving a second data item from the site computing infrastructure: reconciling the first split branch and the second data item to generate a second updated blockchain ledger; and sending the second updated blockchain ledger to the site computing infrastructure. In additional embodiments, at least a plurality of the blockchain nodes in the computing infrastructure is disposed in a remote cloud-based infrastructure, and in response to receiving the first data item for processing, using a plurality of the remote blockchain nodes to update the first blockchain ledger. In additional embodiments, the first updated blockchain ledger is audited. In additional embodiments, updating the first blockchain ledger includes performing a cryptography operation.

According to some embodiments, a method is provided for protecting oil- and gas-production operations data using blockchain, wherein the oil-and gas-production operations location includes site computing infrastructure, the method comprising at a computing infrastructure that includes one or more blockchain nodes: receiving a first data item from the site computing infrastructure; and at a first blockchain node in the one or more blockchain nodes: updating a first blockchain ledger to include the first data item to create a first updated blockchain ledger; when the site computing infrastructure is available, sending the first updated blockchain ledger to the site computing infrastructure; when the site computing infrastructure is unavailable, maintaining the first updated blockchain ledger as a first split branch; and after determining that the site computing infrastructure is unavailable, and in response to receiving a second data item from the site computing infrastructure: reconciling the first split branch and the second data item to generate a second updated blockchain ledger; and sending the second updated blockchain ledger to the site computing infrastructure. In additional embodiments, at least a plurality of the blockchain nodes in the computing infrastructure is disposed in a remote cloud-based infrastructure, and in response to receiving the first data item for processing, using a plurality of the remote blockchain nodes to update the first blockchain ledger. In additional embodiments, the first updated blockchain ledger is audited. In additional embodiments, updating the first blockchain ledger includes performing a cryptography operation.

Various other apparatuses, systems, methods, etc., are also disclosed that practice various aspects of the inventive subject matter.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
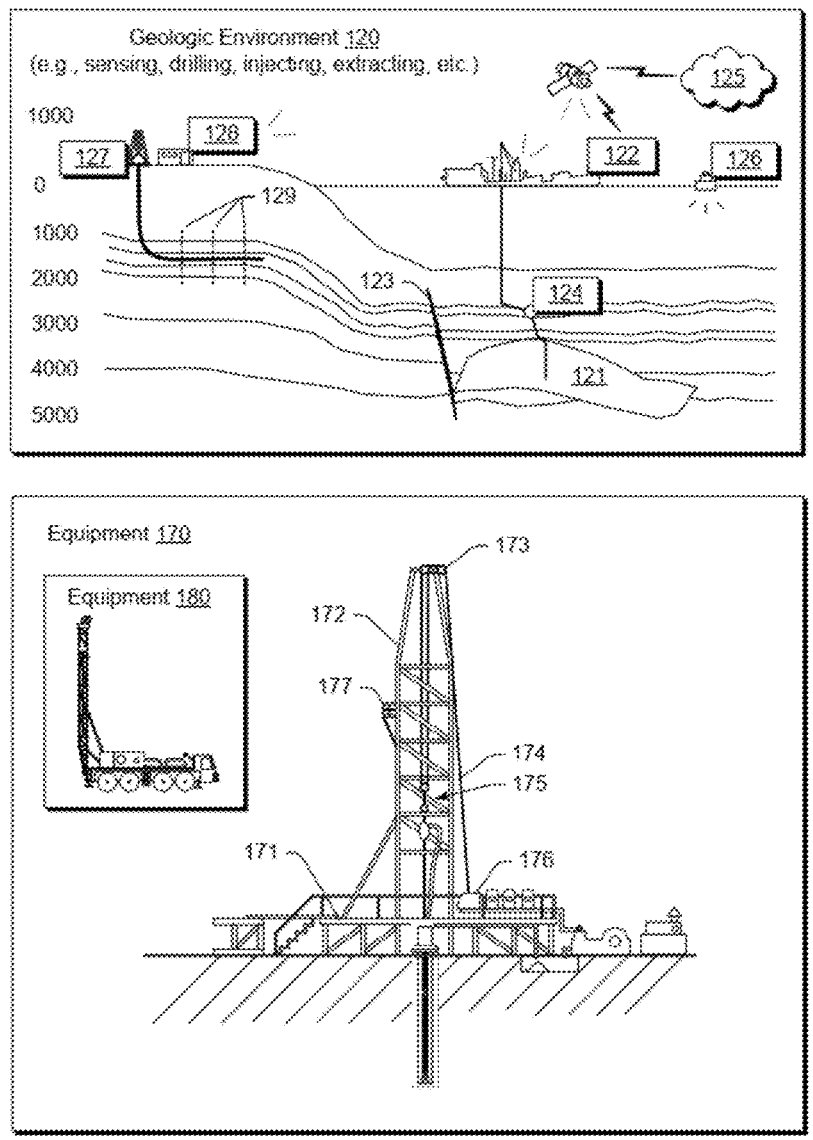
FIG. 1 illustrates examples of equipment in a geologic environment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In an oilfield or other energy generation, capture, and transmission environment, blockchain can protect information such as rig activities, personnel movements and actions, system state and reports that have high detrimental impact in case such records are altered and limit or prevent, for example, performance or incident reviews, by which altered records could support an untruthful storyline to fraudulently protect actors participating in the system.

According to an aspect, a local blockchain distributed infrastructure is deployed where operations are conducted, which may increase trust of a transactional ledger autonomously on premise.

According to another aspect, a model is defined to increase trust by using a hybrid model and extending to the cloud when connectivity is present and performant.

The present disclosure is directed to improved processing systems, apparatus, and methods for oilfield and other energy generation, capture, and transmission environment to provide an ordered combination that provides new results in processing. In an example, the present application describes a new processing device that provides a local/hybrid blockchain in a new form, provides new functionality such as providing a blockchain where it could not be provided before, has higher reliability, uses lower processing resources or provides improved performance. The apparatus and method described cannot be performed manually in any useful sense. Simplified datasets may be used for illustrative purposes but it will be appreciated that the disclosure extends to datasets with many thousands of points thereby necessitating the new hardware-based processing system described herein.

Examples of oil & gas applications in which the described blockchain infrastructure may be deployed include wireline operations, drilling and well construction operations, and production facility and testing operations. Examples of other energy generation, capture, and transmission environments in which the described blockchain infrastructure may be deployed include solar power installations, nuclear power plants, electrical transmission lines and grids, hydroelectric power plants and infrastructure, tidal, current, and wave energy installations, geothermal power sites, wind energy sites, and other power generation facilities along with their grids, instrumentation, transmission lines, and sensors that have data emitting capabilities where the data emitted may be collected and managed with block chain technologies.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion (e.g., a lateral portion) that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system (e.g., an offshore rig, etc.).

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced. As an example, a trip that pulls equipment out of a borehole may be referred to as pulling out of hole (POOH) and a trip that runs equipment into a borehole may be referred to as running in hole (RIH).

Figure 2:
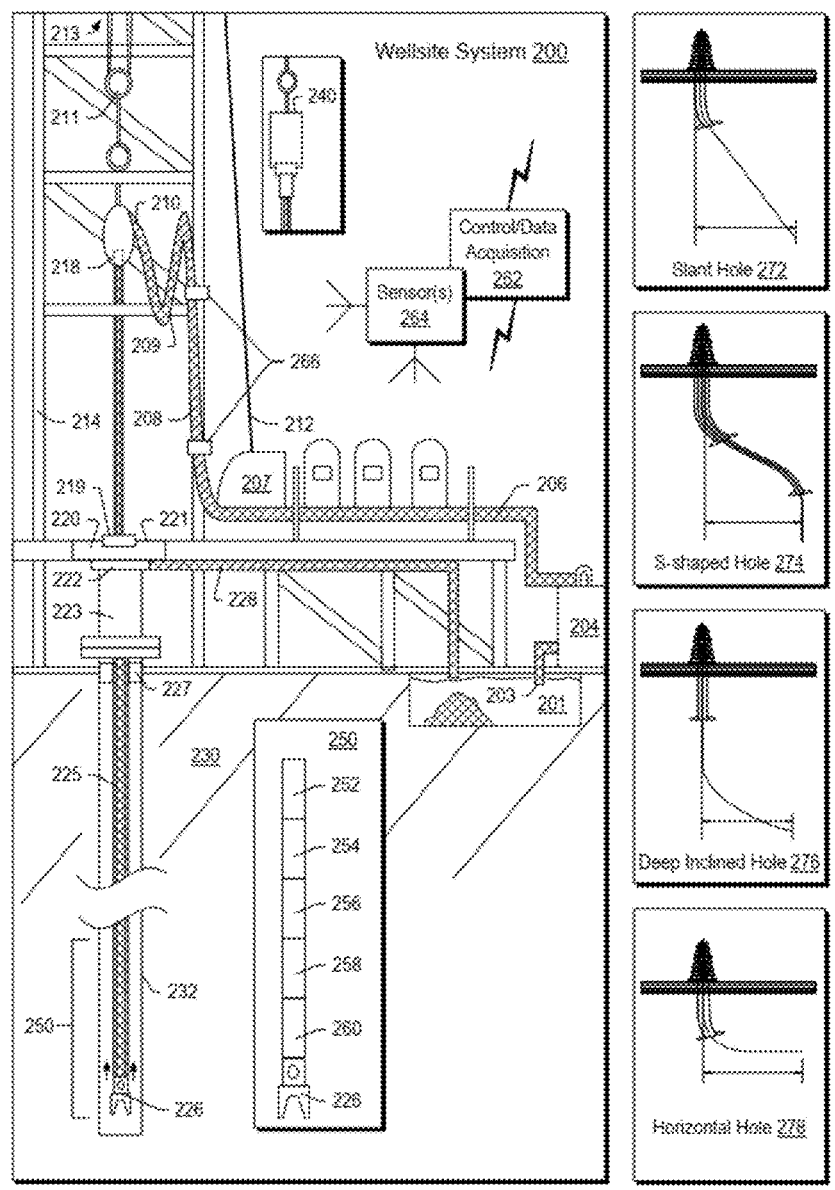
FIG. 2 illustrates examples of equipment and examples of hole types.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use one or more directional drilling techniques, equipment, etc.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the traveling block 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
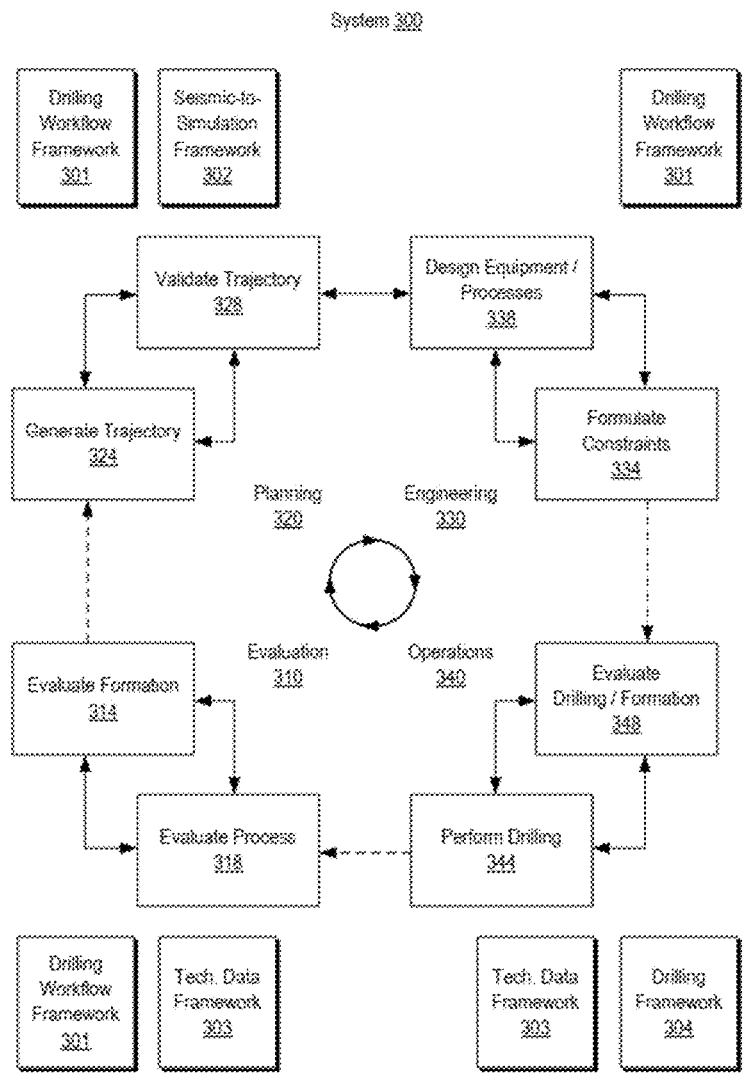
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL framework (Schlumberger, Houston, Texas) and the technical data framework 303 can be, for example, the TECHLOG framework (Schlumberger, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on pre-defined classes, for example, to facilitate modeling, analysis, simulation, etc. An example of an object-based framework is the MICROSOFT.NET framework (Redmond, Washington), which provides a set of extensible object classes. In the.NET framework, an object class encapsulates a module of reusable code and associated data structures. Object classes can be used to instantiate object instances for use in by a program, script, etc. For example, borehole classes may define objects for representing boreholes based on well data.

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

As an example, a framework can include an analysis component that may allow for interaction with a model or model-based results (e.g., simulation results, etc.). As to simulation, a framework may operatively link to or include a simulator such as the ECLIPSE reservoir simulator (Schlumberger, Houston Texas), the INTERSECT reservoir simulator (Schlumberger, Houston Texas), etc.

The aforementioned PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As mentioned with respect to the DELFI environment, one or more frameworks may be interoperative and/or run upon one or another. As an example, a framework environment marketed as the OCEAN framework environment (Schlumberger, Houston, Texas) may be utilized, which allows for integration of add-ons (or plug-ins) into a PETREL framework workflow. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. In a framework environment (e.g., OCEAN, DELFI, etc.), a model simulation layer can include or operatively link to a model-centric framework. In an example embodiment, a framework may be considered to be a data-driven application. For example, the P PETREL framework can include features for model building and visualization. As an example, a model may include one or more grids where a grid can be a spatial grid that conforms to spatial locations per acquired data (e.g., satellite data, logging data, seismic data, etc.).

As an example, a model simulation layer may provide domain objects, act as a data source, provide for rendering and provide for various user interfaces. Rendering capabilities may provide a graphical environment in which applications can display their data while user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL framework, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA framework, marketed by Schlumberger, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL framework, etc.).

As an example, a workflow may be a process implementable at least in part in a framework environment and by one or more frameworks. As an example, a workflow may include one or more worksteps that access a set of instructions such as a plug-in (e.g., external executable code, etc.). As an example, a framework environment may be cloud-based where cloud resources are utilized that may be operatively coupled to one or more pieces of field equipment such that data can be acquired, transmitted, stored, processed, analyzed, etc., using features of a framework environment. As an example, a framework environment may employ various types of services, which may be backend, frontend or backend and frontend services. For example, consider a client-server type of architecture where communications may occur via one or more application programming interfaces (APIs), one or more microservices, etc.

As an example, a framework may provide for modeling petroleum systems. For example, the modeling framework marketed as the PETROMOD framework (Schlumberger, Houston, Texas), which includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures).

As an example, information acquired by a tool or tools may be analyzed using a framework such as the TECHLOG framework. As an example, the TECHLOG framework can be interoperable with one or more other frameworks such as, for example, the PETREL framework.

As an example, various aspects of a workflow may be completed automatically, may be partially automated, or may be completed manually, as by a human user interfacing with a software application that executes using hardware (e.g., local and/or remote). As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model (s), well trajectory (ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO framework tools (Schlumberger, Houston, Texas), and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well (e.g., a trajectory) that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 4:
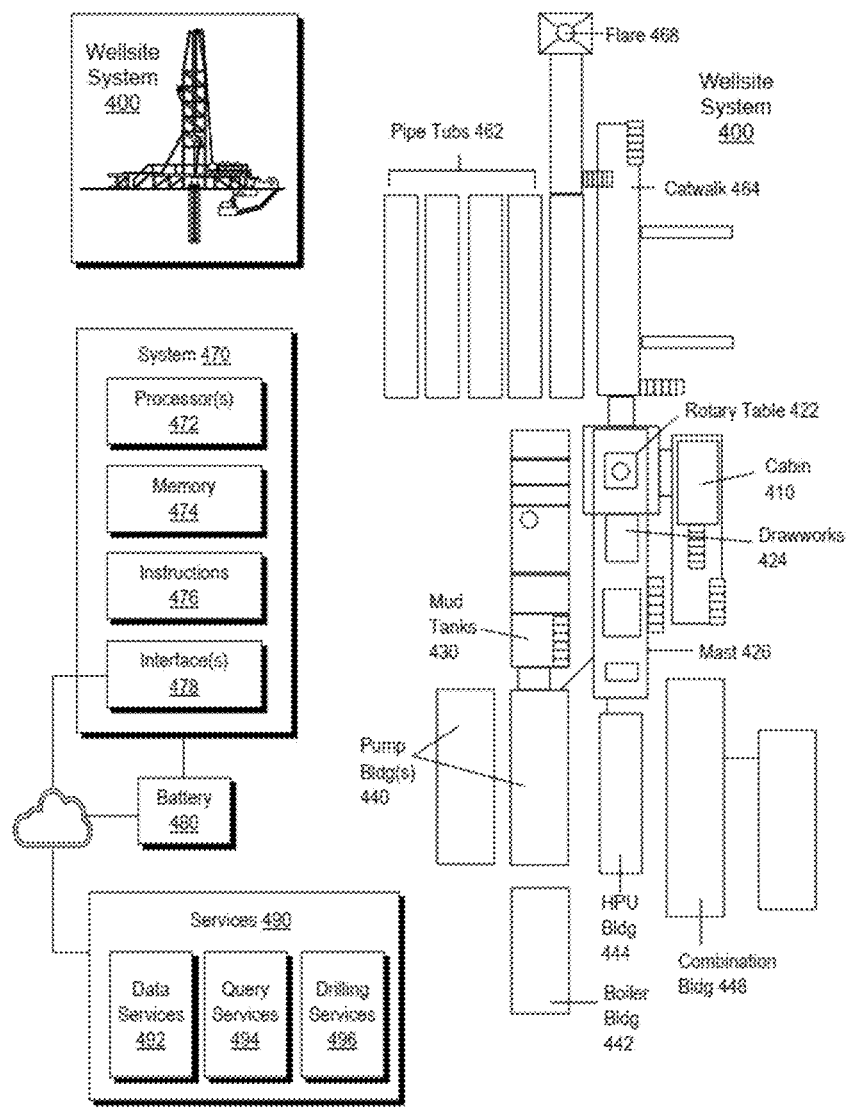
FIG. 4 illustrates an example of a wellsite system and an example of a computing system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

Figure 5:
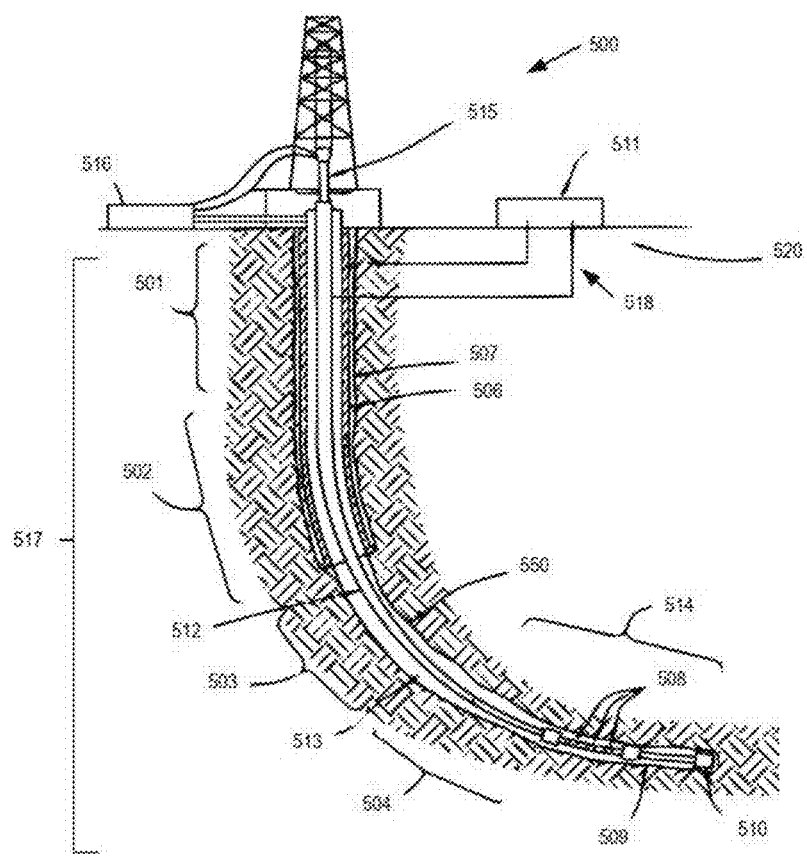
FIG. 5 illustrates an example of equipment in a geologic environment.

FIG. 5 shows a schematic diagram depicting an example of a drilling operation of a directional well in multiple sections. The drilling operation depicted in FIG. 5 includes a wellsite drilling system 500 and a field management tool 520 for managing various operations associated with drilling a bore hole 550 of a directional well 517. The wellsite drilling system 500 includes various components (e.g., drillstring 512, annulus 513, bottom hole assembly (BHA) 514, kelly 515, mud pit 516, etc.). As shown in the example of FIG. 5, a target reservoir may be located away from (as opposed to directly under) the surface location of the well 517. In such an example, special tools or techniques may be used to ensure that the path along the bore hole 550 reaches the particular location of the target reservoir.

As an example, the BHA 514 may include sensors 508, a rotary steerable system (RSS) 509, and a bit 510 to direct the drilling toward the target guided by a pre-determined survey program for measuring location details in the well. Furthermore, the subterranean formation through which the directional well 517 is drilled may include multiple layers (not shown) with varying compositions, geophysical characteristics, and geological conditions. Both the drilling planning during the well design stage and the actual drilling according to the drilling plan in the drilling stage may be performed in multiple sections (see, e.g., sections 501, 502, 503 and 504), which may correspond to one or more of the multiple layers in the subterranean formation. For example, certain sections (e.g., sections 501 and 502) may use cement 507 reinforced casing 506 due to the particular formation compositions, geophysical characteristics, and geological conditions.

In the example of FIG. 5, a surface unit 511 may be operatively linked to the wellsite drilling system 500 and the field management tool 520 via communication links 518. The surface unit 511 may be configured with functionalities to control and monitor the drilling activities by sections in real time via the communication links 518. The field management tool 520 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 518 according to a drilling operation workflow. The communication links 518 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real time data associated with one or more operations such as, for example, a drilling operation or drilling operations. As an example, consider the PERFORM™ toolkit framework (Schlumberger Limited, Houston, Texas).

As an example, a service can be or include one or more of OPTIDRILL™, OPTILOG™ and/or other services marketed by Schlumberger Limited, Houston, Texas.

The OPTIDRILL™ technology can help to manage downhole conditions and BHA dynamics as a real time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO™ framework).

The OPTILOG™ technology can help to evaluate drilling system performance with single-or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Texas) may be provided for one or more wellsite operations. In such an example, data may be acquired and stored where such data can include time series data that may be received and analyzed, etc.

As an example, one or more M-I SWACO™ services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX™ services (e.g., via the ONE-TRAX software platform, M-I L.L.C., Houston, Texas) may be provided for one or more wellsite operations. In such an example, data may be acquired and stored where such data can include time series data that may be received and analyzed, etc.

As an example, various operations can be defined with respect to WITS or WITSML, which are acronyms for well-site information transfer specification or standard (WITS) and markup language (WITSML). WITS/WITSML specify how a drilling rig or offshore platform drilling rig can communicate data. For example, as to slips, which are an assembly that can be used to grip a drillstring in a relatively non-damaging manner and suspend the drillstring in a rotary table, WITS/WITSML define operations such as "bottom to slips" time as a time interval between coming off bottom and setting slips, for a current connection; "in slips" as a time interval between setting the slips and then releasing them, for a current connection; and "slips to bottom" as a time interval between releasing the slips and returning to bottom (e.g., setting weight on the bit), for a current connection.

Well construction can occur according to various procedures, which can be in various forms. As an example, a procedure can be specified digitally and may be, for example, a digital plan such as a digital well plan. A digital well plan can be an engineering plan for constructing a wellbore. As an example, procedures can include information such as well geometries, casing programs, mud considerations, well control concerns, initial bit selections, offset well information, pore pressure estimations, economics and special procedures that may be utilized during the course of well construction, production, etc. While a drilling procedure can be carefully developed and specified, various conditions can occur that call for adjustment to a drilling procedure.

As an example, an adjustment can be made at a rigsite when acquisition equipment acquire information about conditions, which may be for conditions of drilling equipment, conditions of a formation, conditions of fluid(s), conditions as to environment (e.g., weather, sea, etc.), etc. Such an adjustment may be made on the basis of personal knowledge of one or more individuals at a rigsite. As an example, an operator may understand that conditions call for an increase in mudflow rate, a decrease in weight on bit, etc. Such an operator may assess data as acquired via one or more sensors (e.g., torque, temperature, vibration, etc.). Such an operator may call for performance of a procedure, which may be a test procedure to acquire additional data to understand better actual physical conditions and physical phenomena that may occur or that are occurring. An operator may be under one or more time constraints, which may be driven by physical phenomena, such as fluid flow, fluid pressure, compaction of rock, borehole stability, etc. In such an example, decision making by the operator can depend on time as conditions evolve. For example, a decision made at one fluid pressure may be sub-optimal at another fluid pressure in an environment where fluid pressure is changing. In such an example, timing as to implementing a decision as an adjustment to a procedure can have a broad ranging impact. An adjustment to a procedure that is made too late or too early can adversely impact other procedures compared to an adjustment to a procedure that is made at an optimal time (e.g., and implemented at the optimal time).

Figure 6:
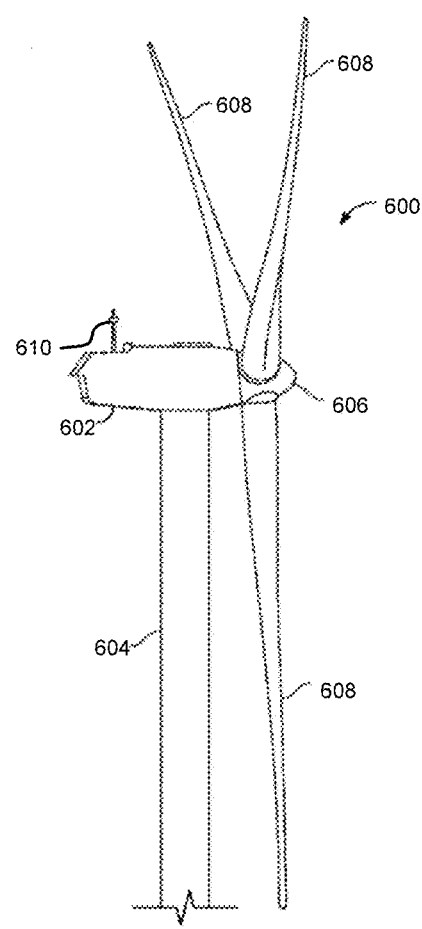
FIG. 6 illustrates a side elevational view of a wind turbine.

As shown in FIG. 6, a wind turbine 600 generally comprises a nacelle 602 housing a generator (not shown in FIG. 6). Nacelle 602 is a housing mounted atop a tower 604, only a portion of which is shown in FIG. 6. The tower 604 may be on land or at sea. The height of tower 604 is selected based upon factors and conditions known in the art, and may extend to heights up to 60 meters or more. The wind turbine 600 may be installed on any terrain providing access to areas having desirable wind conditions. The terrain may vary greatly and may include, but is not limited to, mountainous terrain or off-shore locations. Wind turbine 600 also comprises a rotor 606 that includes one or more rotor blades 608. Although wind turbine 600 illustrated in FIG. 6 includes three rotor blades 608, there are no specific limits on the number of rotor blades 608 required.

The wind turbine 600 and tower 604 includes a large variety of equipment and components that are susceptible to vandalism and/or burglary, particularly in wind turbines 600 installed in more remote locations. Certain components are susceptible to theft, while others are subject to damage or destruction from access. In addition, exterior surfaces of the tower 604 may be damaged, requiring repair or servicing.

Wind turbine 600 utilizes one or more cameras, sensors, and other devices 610 that may emit data for transmission to a remote location for analysis to determine whether components are missing, damaged or otherwise require maintenance. In addition, if unauthorized personnel are detected, authorities or emergency services may be contacted and/or dispatched to the wind turbine 600 and tower 604.

Figure 7:
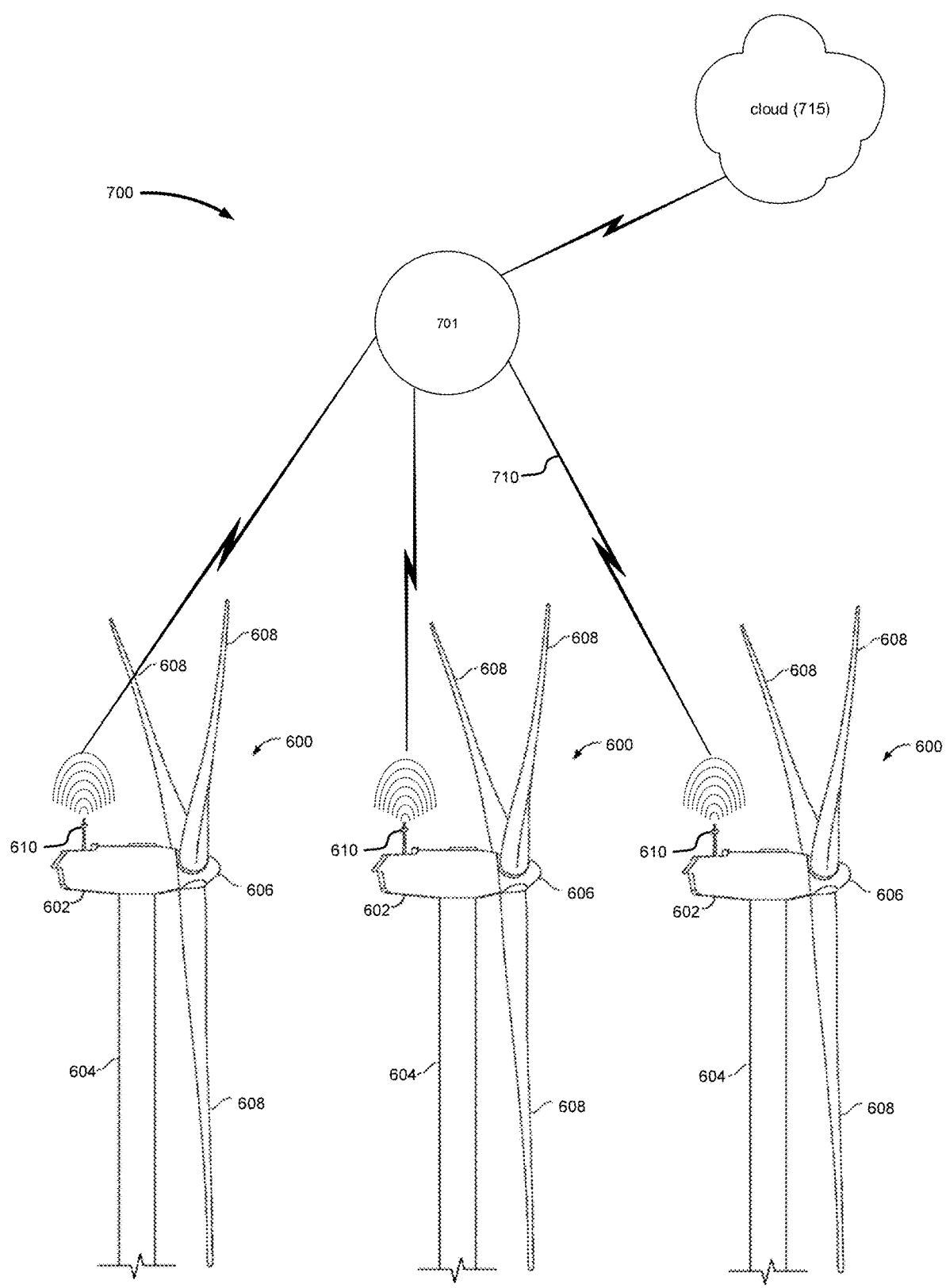
FIG. 7 illustrates a wind turbine farm.

FIG. 7 shows a wind turbine monitoring system 700 according to an embodiment of the present disclosure. The system 200 includes a central monitoring device 701 and a plurality of wind turbines 600 in one or more fields. The number of wind turbines 600 in the system 700 is not limited and may include one or a large number of wind turbines 600. A device 610 is mounted on or within one or more of the wind turbines 600 and respective towers 604, and generates data 710 that may include without limitation operating and environmental conditions, computational capability of the data processing infrastructure (including ability to manage and use cryptography keys, hashes and capabilities), equipment-related data, sensor data and measurements, maintenance information, visual data from camera(s), and the like. The central monitoring device 701 may be a data acquisition device such as a computer, a data storage device, or other analysis tool. In another embodiment, the central monitoring device 701 may be a communication device, tablet, or other computational device usable by personnel. In another embodiment the central monitoring device 701 is the power control for a wind turbine farm or a utility operating the wind turbine farm. The central monitoring device 701 may be autonomous or may be integrated within the wind farm control. The data 710 may be transmitted to and/or from the wind turbine 600 and tower 704 in order to provide control or otherwise communicate with the wind turbine 600 in response to a condition requiring maintenance in response to any received signals. In certain embodiments, equipment or other operational parameters may be transmitted and received.

In some embodiments, data 710 includes blockchain managed data in accordance with embodiments according to the present disclosure. In some embodiments, central monitoring device 701 places data 710 in a cloud 715 for access by others over a network.

While in FIG. 7 data 710 emitted from device 610 is via wireless transmission according to typical methods, in other embodiments, wired connections, such as via ethernet, may be used for data transmission to central monitoring device 710.

Figure 8:
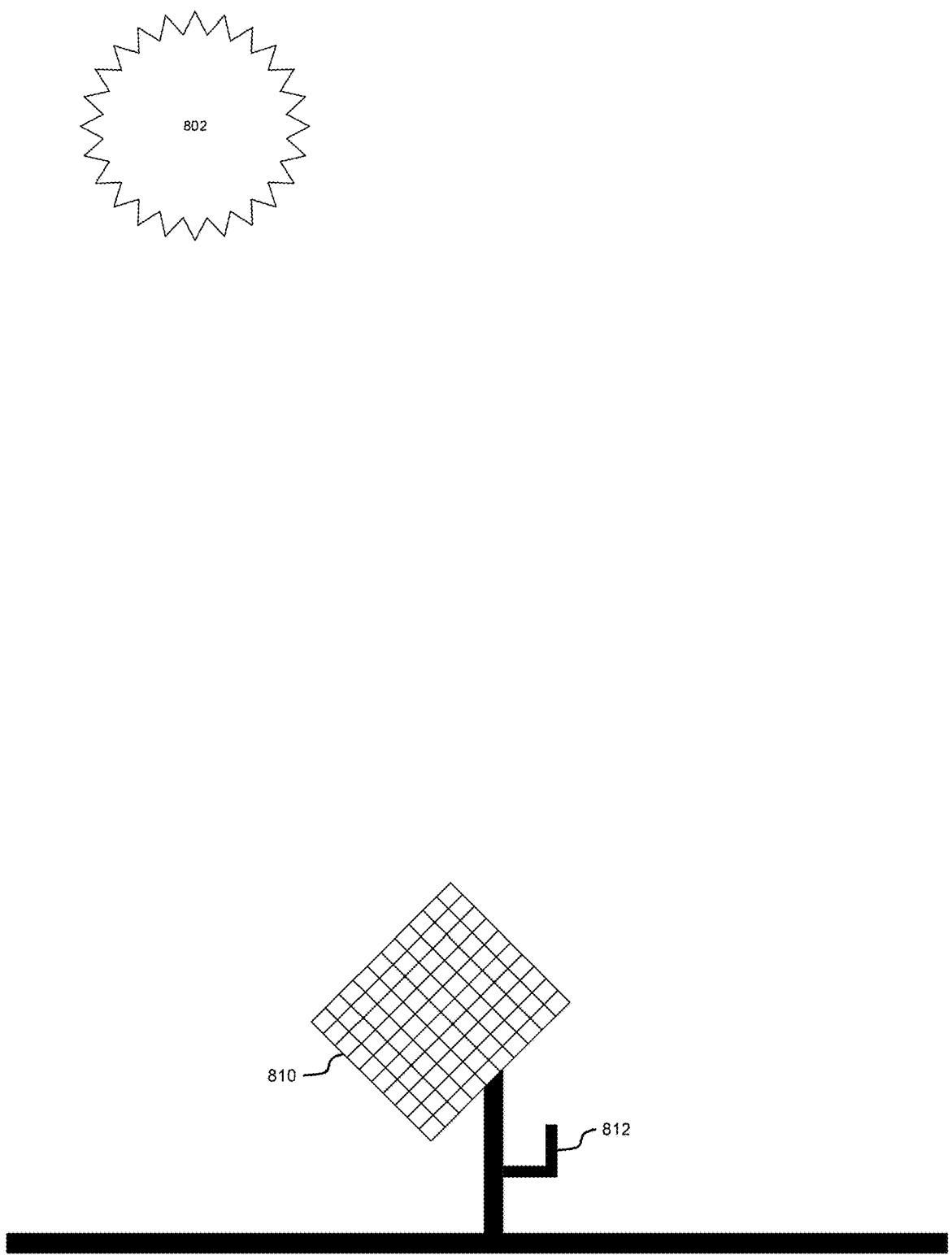
FIG. 8 illustrates a solar panel.

In FIG. 8, the sun 802 emits radiation collected by solar panel 810, which includes an instrumentation package 812 utilizing one or more cameras, sensors, and other devices that may emit data for transmission to a remote location for analysis to determine whether components are missing, damaged or otherwise require maintenance. In addition, if unauthorized personnel are detected, authorities or emergency services may be contacted and/or dispatched to the solar panel 810.

Figure 9:
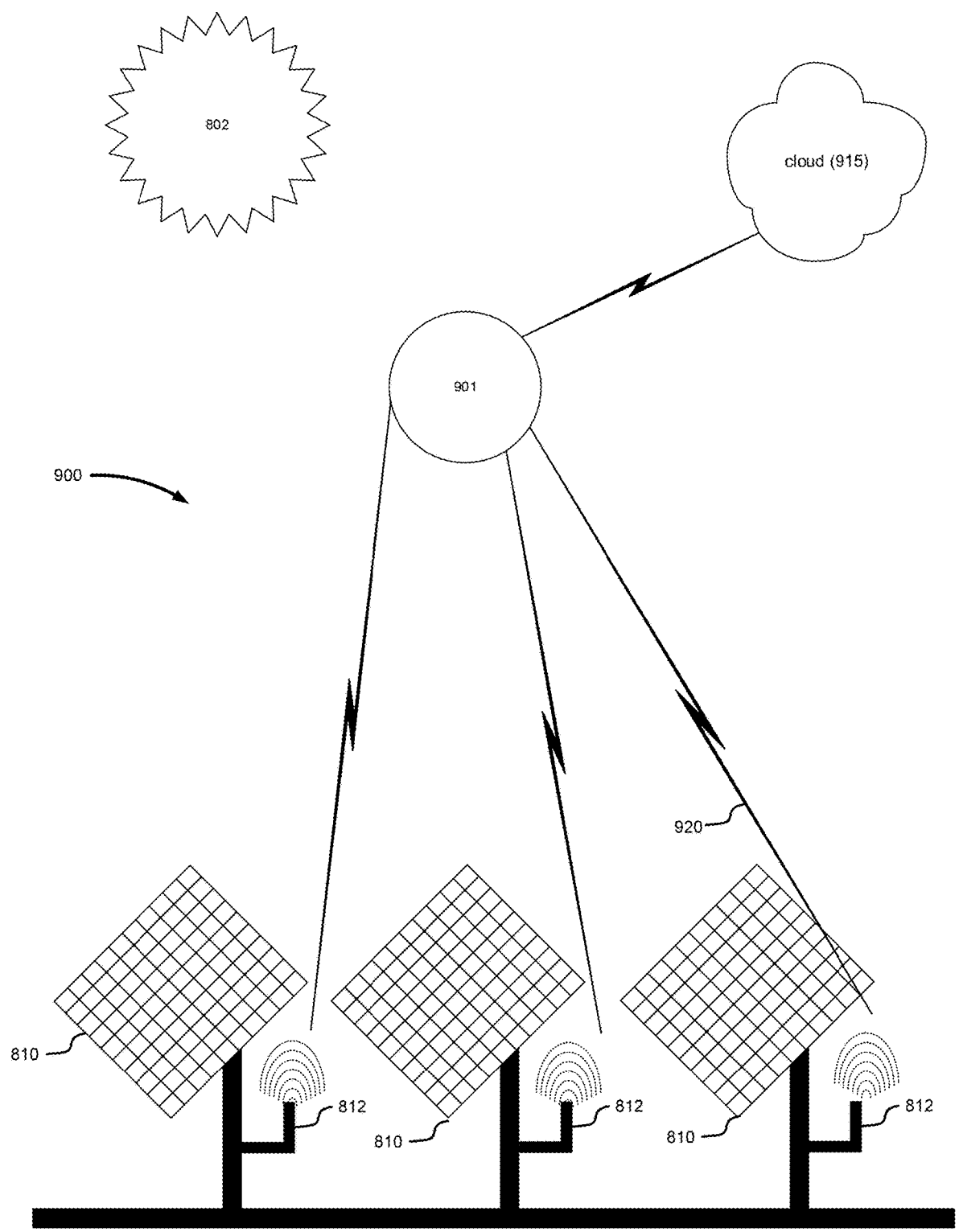
FIG. 9 illustrates a solar panel farm.

FIG. 9 shows a solar panel monitoring system 900 according to an embodiment of the present disclosure. The system 200 includes a central monitoring device 901 and a plurality of solar panels 810 in one or more fields. The number of panels 810 in the system 900 is not limited and may include one or a large number of panels. Instrumentation package 812 is mounted on or within one or more of the panels, and generates data 920 that may include without limitation operating and environmental conditions, equipment-related data, sensor data and measurements, maintenance information, visual data from camera(s), and the like. The central monitoring device 901 may be a data acquisition device such as a computer, a data storage device, or other analysis tool. In another embodiment, the central monitoring device 901 may be a communication device, tablet, or other computational device usable by personnel. In another embodiment the central monitoring device 901 is the power control for a solar panel farm or a utility operating the farm. The central monitoring device 901 may be autonomous or may be integrated within the solar panel farm control. The data 920 may be transmitted to and/or from the panel 810 in order to provide control or otherwise communicate with the panel 810 in response to a condition requiring maintenance in response to any received signals. In certain embodiments, equipment or other operational parameters may be transmitted and received.

In some embodiments, data 920 includes blockchain managed data in accordance with embodiments according to the present disclosure. In some embodiments, central monitoring device 901 places data 920 in a cloud 915 for access by others over a network.

While in FIG. 9 data 920 emitted from device 812 is via wireless transmission according to typical methods, in other embodiments, wired connections, such as via ethernet, may be used for data transmission to central monitoring device 901.

Figure 10:
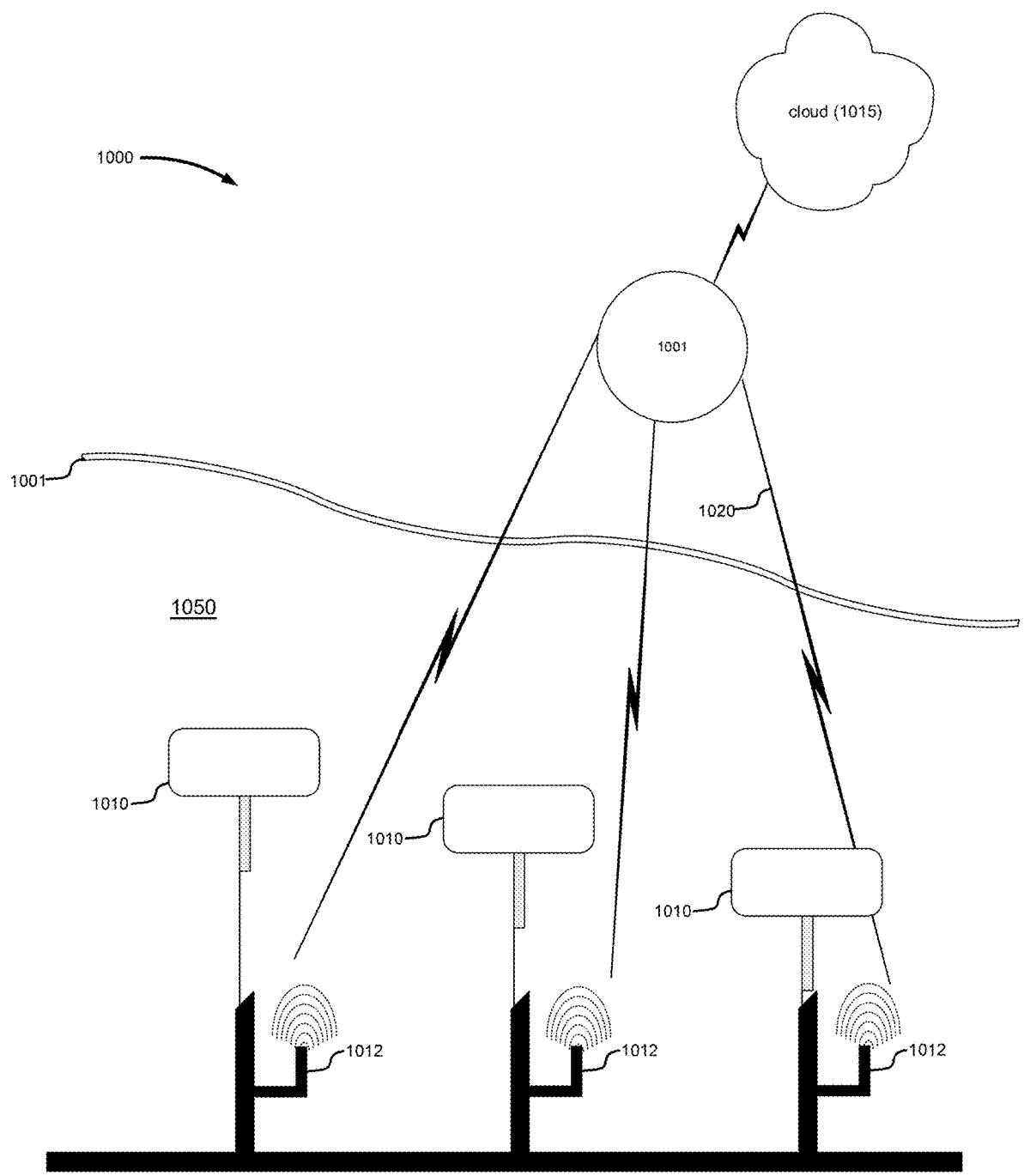
FIG. 10 illustrates an ocean power generation farm.

In FIG. 10, ocean 1050 has wave and tidal fluctuations that move one or more water-based power generation devices that include buoyant actuators 1010, whose overall system assemblies include an instrumentation package 1012 utilizing one or more cameras, sensors, and other devices that may emit data for transmission to a remote location for analysis to determine whether components are missing, damaged or otherwise require maintenance. In addition, if unauthorized personnel or testy sharks are detected, authorities or emergency services may be contacted and/or dispatched to the water-based power generation devices.

System 1000 according to an embodiment of the present disclosure includes a central monitoring device 1001 and a plurality of water-based power generation devices that include buoyant actuators 1010 in one or more fields in the sea. The number of water-based power generation devices in the system 1000 is not limited and may include one or a large number. Instrumentation package 1012 is located on or within the water-based power generation devices, and generates data 1020 that may include without limitation operating and environmental conditions, equipment-related data, sensor data and measurements, maintenance information, visual data from camera(s), and the like. The central monitoring device 1001 may be a data acquisition device such as a computer, a data storage device, or other analysis tool, either above or below the surface of the ocean 1050. In some embodiments, the central monitoring device 1001 may be on a vessel. In another embodiment, the central monitoring device 1001 may be a communication device, tablet, or other computational device usable by personnel. In another embodiment the central monitoring device 1001 is the power control facility on land for the utility operating the array of water-based power generation devices. The central monitoring device 1001 may be autonomous or may be integrated within the controls for the array. The data 1020 may be transmitted to and/or from the water-based power generation device(s) in order to provide control or otherwise communicate in response to a condition requiring maintenance in response to any received signals. In certain embodiments, equipment or other operational parameters may be transmitted and received.

In some embodiments, data 1020 includes blockchain managed data in accordance with embodiments according to the present disclosure. In some embodiments, central monitoring device 1001 places data 1020 in a cloud 1015 for access by others over a network.

While in FIG. 10 data 1020 emitted from device 1012 is via wireless transmission (e.g., using hydrophones and other data transmission and conversion techniques for sea-based communications transitioning through the water column through and past the surface for reception on or above the surface), in other embodiments, wired connections, such as via ethernet, may be used for data transmission to central monitoring device 1001 (e.g., when central monitoring device 1001 is on-shore and connected via cables).

While other power generation environments, including without limitation, remote geothermal generation locations, nuclear, and others are not depicted by figures, those with skill in the art will appreciate that the disclosed data transmission capabilities may also use the disclosed blockchain inventions. Similarly, infrastructure such as electrical transmission lines and grids that need various secure and traceable information transmission may also use the disclosed blockchain inventions.

Figure 11:
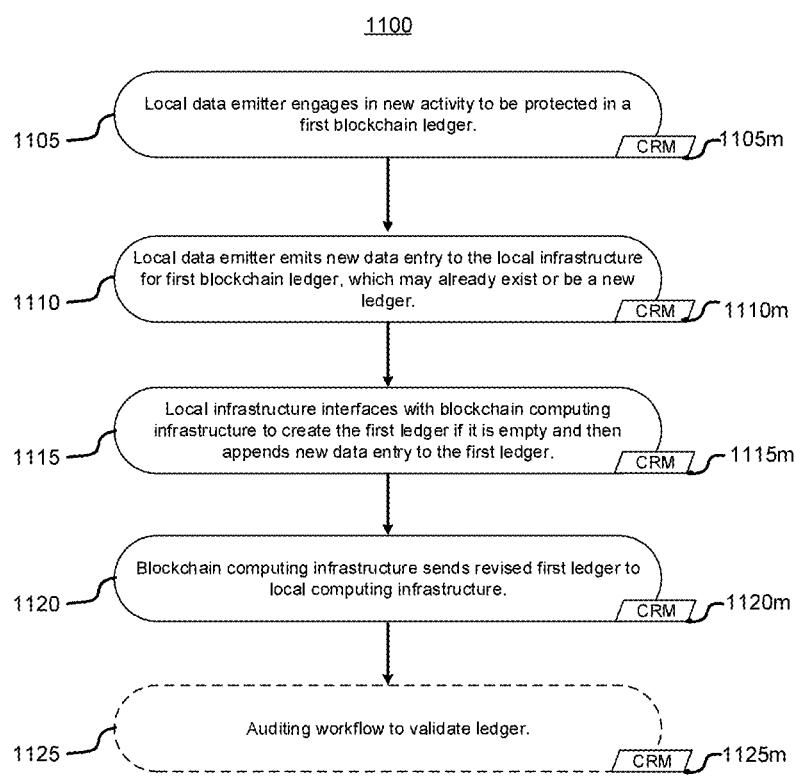
FIG. 11 illustrates a local model blockchain creation and augmentation workflow.

Referring to FIG. 11, a system and interactions that take place therein in a local blockchain workflow 1100 will be discussed. A blockchain ledger may be an empty or existing ledger that includes information to be trusted and tamper-proofed. A new entry that may not be secured yet may be an activity log, a decision captured by the system, or other data element. In various embodiments, local blockchain computing infrastructure includes more than one node, which may include a CPU with one or more cores.

In the example workflow 1100 of FIG. 11, a new activity 1105 is captured by the system; this activity is to be appended to the blockchain secured ledger (see FIG. 11, 1105, Local data emitter engages in new activity to be protected in a first blockchain ledger).

In operation, the new entry for the ledger is provided 1110 to the local infrastructure which interfaces the blockchain system to create and validate a new block for that entry (see FIG. 11, Local data emitter emits new data entry to the local infrastructure for first blockchain ledger, which may already exist or be a new ledger). The new block is appended 1115 to the existing ledger (or the ledger is created on this request, and the new entry is incorporated) (see FIG. 11, Local infrastructure interfaces with blockchain computing infrastructure to create the first ledger if it is empty and then appends new data entry to the first ledger). The blockchain system then sends 1120 back to the local infrastructure the revised first ledger (see FIG. 11, Blockchain computing infrastructure sends revised first ledger to local computing infrastructure).

In various embodiments, the local blockchain infrastructure includes one or more of: a) physical protection so that unauthorized users cannot access the computing or network resources of that infrastructure, b) private keys used to create blocks are secured via hardware or using hardware during provisioning, and c) software protection with high security is enforced throughout the system so breaches that could alter the system are avoided.

In some embodiments, an optional auditing workflow 1125 is provided so that the ledger may be validated locally or in town using a public key (see FIG. 11, Auditing workflow to validate ledger).

Figure 12:
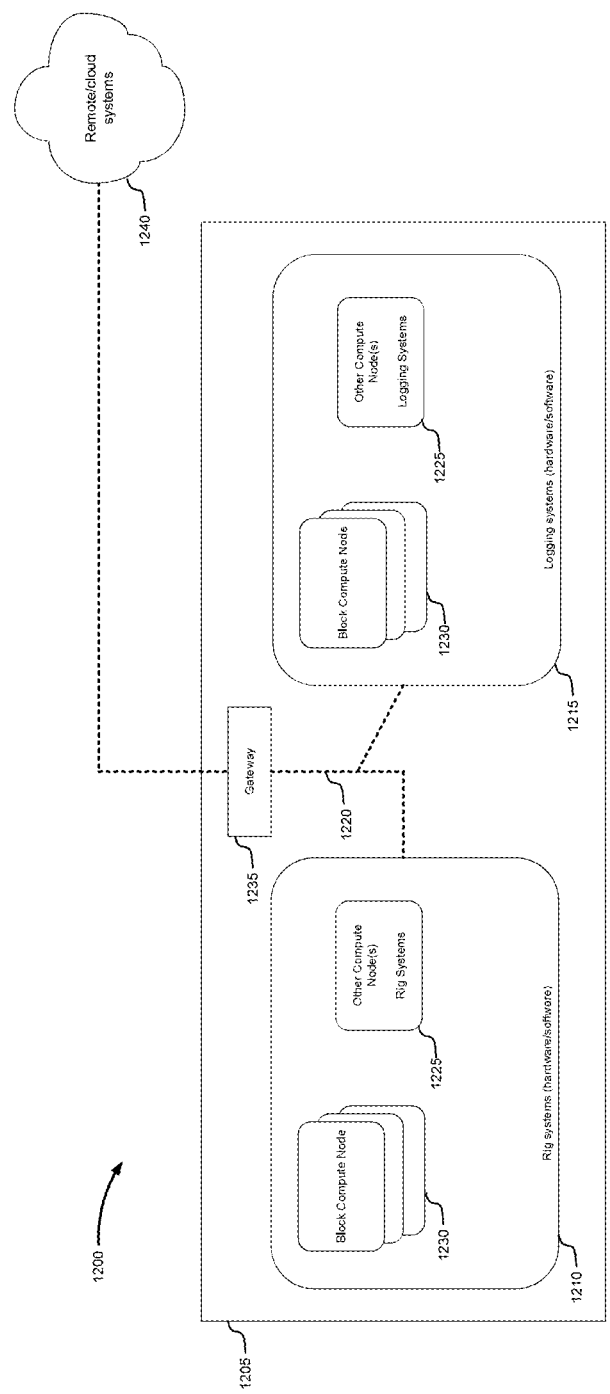
FIG. 12 illustrates a conceptual blockchain infrastructure at a well site or rig site.

Referring to FIG. 12, deployment of the blockchain infrastructure 1200 at a wellsite/rigsite will be discussed. The wellsite/rigsite systems 1205 may include a number of systems such as rig systems 1210, and logging units 1215.

In the wellsite system, a number of computation nodes may be available. A distributed computing infrastructure may be implemented over a local network 1220 to support operations involved with the rig and logging 1225. This computation infrastructure can be used and augmented to support a number of blockchain nodes 1230. The wellsite may include a gateway system 1235 to connect the site to remote systems 1240, such as private or public internet and cloud services, depending on the operators, coverage and other constraints.

Figure 13A:
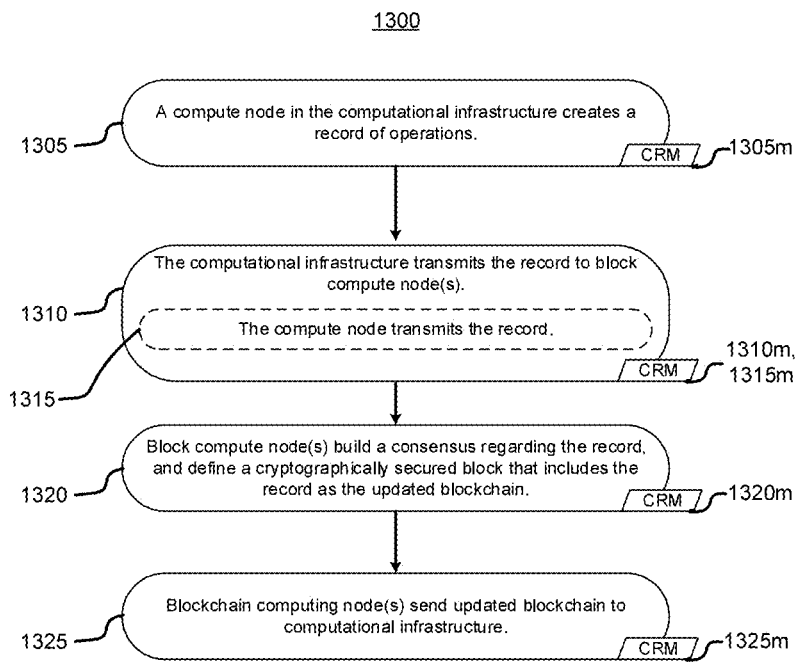
FIG. 13A illustrates a method of updating a blockchain in accordance with some embodiments disclosed herein.

FIG. 13A illustrates an example method 1300 of interactions between the computational infrastructure at a well site to secure a record of operations. In the illustrated sequence, the method 1300 includes creating 1305 a record of operations from a compute node (e.g., FIG. 12 other compute node(s) for Rig systems 1225; FIG. 13A 1305) and the computation infrastructure requests to secure the record by transmitting to the block compute nodes (e.g., FIG. 12 block compute node(s) 1230; FIG. 13A 1310). In some embodiments, the compute node transmits 1315 the record.

The block compute nodes build a consensus and defines the cryptographically secured block that incorporates the record of operations (FIG. 13A 1320). The revised and updated blockchain that includes the record is then returned to the calling compute node and/or systems (e.g., FIG. 12 rig systems 1210, rig systems other compute node 1225; FIG. 13A 1325) as an updated blockchain.

Figure 13B:
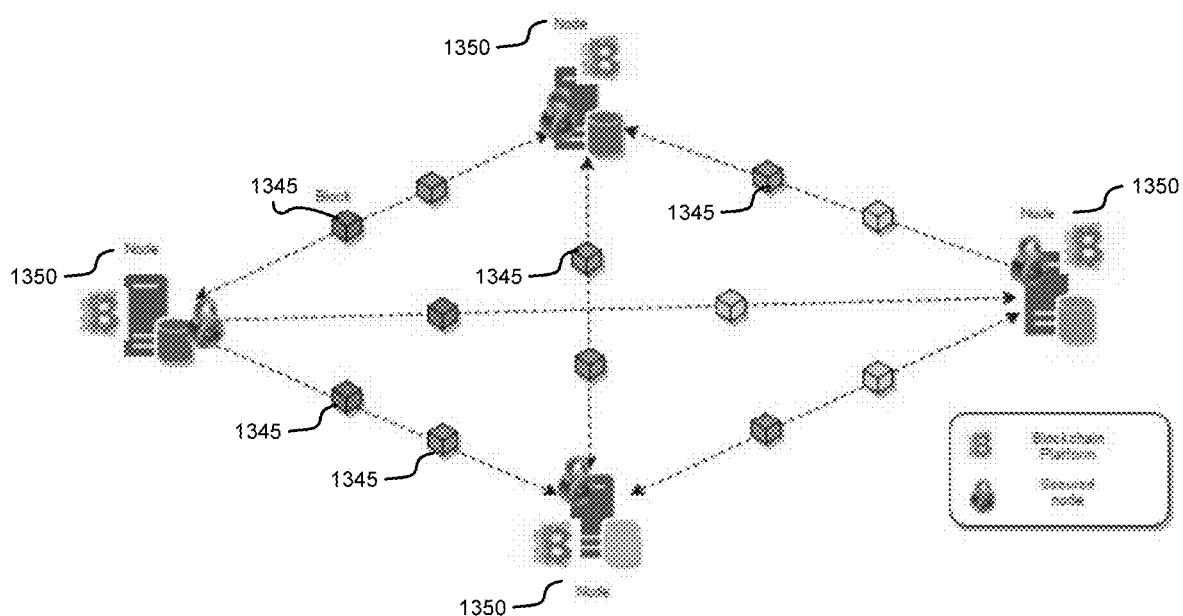
FIG. 13B illustrates redundant communication of blocks in a blockchain.

FIG. 13B illustrates the redundant communication of blocks 1345 between nodes 1350 of the local blockchain. For example, the system may operate even if some of the nodes 1350 fail (or the interconnect between some of the nodes fail). It also provides scalability and increases integrity by making it more difficult to compromise as the number of nodes and the redundancy expands.

Figure 14A:
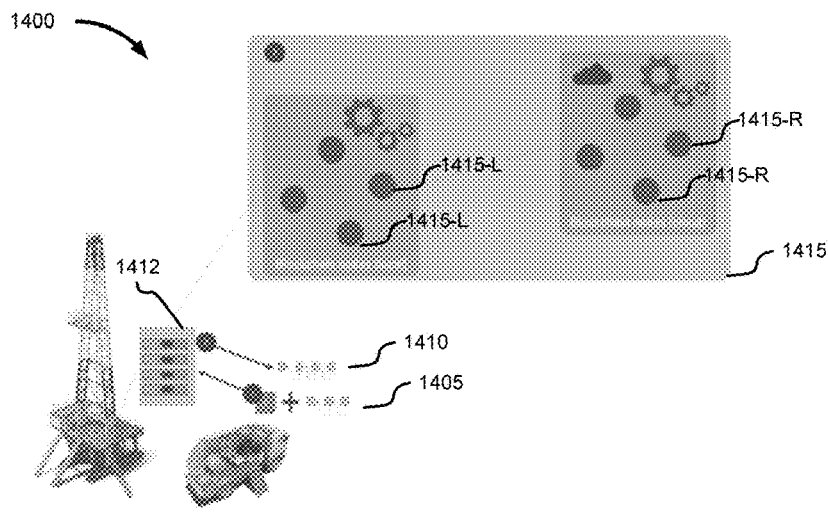
FIG. 14A illustrates a conceptual hybrid blockchain infrastructure at a well site or rig site.
Figure 14B:
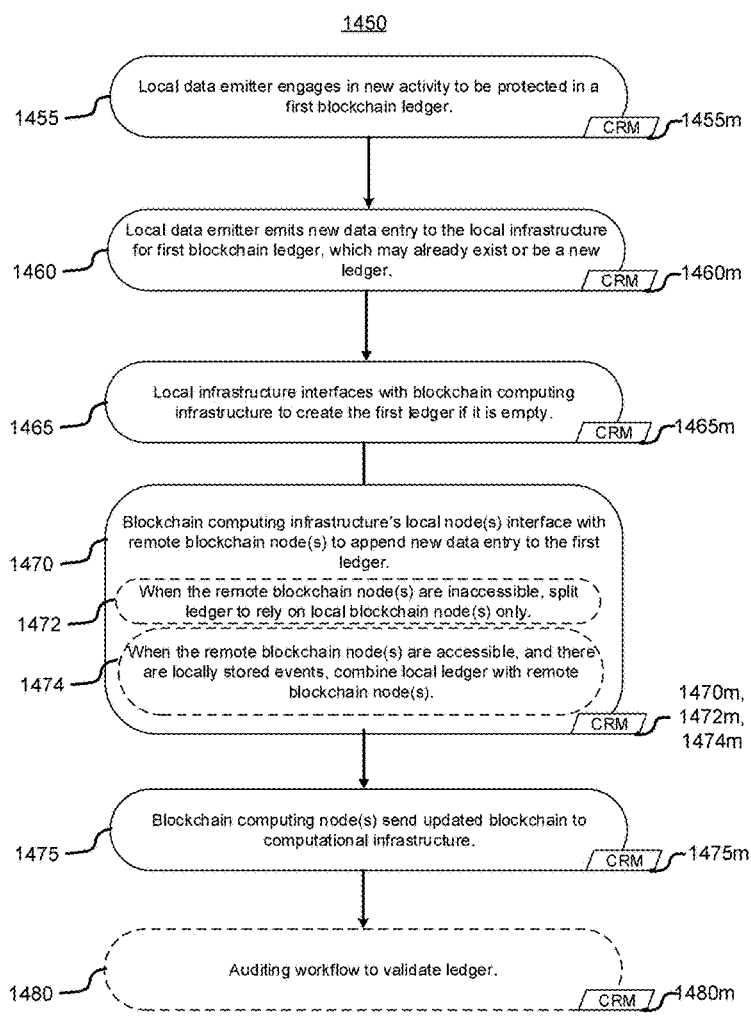
FIG. 14B illustrates a method of updating a blockchain in accordance with some embodiments disclosed herein.

Referring to FIGS. 14A and 14B, a hybrid local and cloud workflow 1400 according to some embodiments will be discussed. Blockchain ledger 1405 may be an empty or existing ledger that includes information to be trusted and tamper-proofed. A new entry 1410 that may not be secured yet may be an activity log, a decision captured by the system, or other data element is to be sent to the local computing infrastructure 1412. The blockchain infrastructure 1415 includes one or more local nodes 1415-L and one or more remote nodes 1415-R. The node(s) may include a CPU with one or more cores.

In the example workflow 1450 illustrated in FIG. 14B, a new activity is captured by the system; this activity is to be appended to the blockchain secured ledger (see FIG. 14B, 1455, Local data emitter engages in new activity to be protected in a first blockchain ledger).

In operation, the new entry for the ledger is provided 1460 to the local infrastructure which interfaces the blockchain system to create and validate a new block for that entry (see FIG. 14B, 1460, Local data emitter emits new data entry to the local infrastructure for first blockchain ledger, which may already exist or be a new ledger; see, e.g., FIG. 14A 1405, 1412, and 1415).

In the example of workflow 1450, which is a hybrid local-remote blockchain workflow, the local blockchain node(s) interface with the remote blockchain node(s) to complement the block creation for the new entry in the ledger (see FIG. 14B, 1465, Local infrastructure interfaces with blockchain computing infrastructure to create the first ledger if it is empty).

The new block is appended 1470 to the existing ledger (or the ledger is created on this request, and the new entry is incorporated) (see FIG. 14B, 1470, Blockchain computing infrastructure's local node(s) interface with remote blockchain node(s) to append new data entry to the first ledger). The blockchain system then sends 1475 back to the local infrastructure the revised first ledger (see FIG. 14B, 1475, Blockchain computing infrastructure sends revised first ledger to local computing infrastructure).

In various embodiments, the local blockchain infrastructure includes one or more of: a) physical protection so that unauthorized users cannot access the computing or network resources of that infrastructure, b) private keys used to create blocks are secured via hardware or using hardware during provisioning, and c) software protection with high security is enforced throughout the system so breaches that could alter the system are avoided.

In some embodiments, an optional auditing workflow 1480 is provided so that the ledger may be validated locally or in town using a public key (see FIG. 14B, 1480, Auditing workflow to validate ledger).

In a hybrid local and cloud system, such as one illustrated in FIGS. 14A and 14B, connectivity or access to the cloud may be limited or intermittent. This may occur in remote locations, such as where oilfield activities or other energy collection, generation, and transmission take place. Without always-on access to global internet communications capabilities, traditional blockchain may not function as intended when the nodes cannot reliably communicate with one another and the ledger becomes unreliable or ledger operations cannot be completed.

In the example of workflow 1450, a hybrid local/remote blockchain ledger may be split 1472 when the one or more nodes are not able to communicate (see FIG. 14B 1472, when the remote blockchain node(s) are inaccessible, split ledger to rely on local blockchain node(s) only); in this case, blocks representing new entries may continue to be added to the now local blockchain ledger(s). Upon reconnection of the nodes, i.e., when inaccessible remote or otherwise unavailable remote or local blockchain nodes become available, the information in the local blockchains may be combined (see FIG. 14B 1474, When the remote blockchain node(s) are accessible, and there are locally stored events, combine local ledger with remote blockchain node(s)). In some embodiments, the process of combining split ledgers, local or remote, may repeat with blockchain branches in one or more ledgers. In an example, combining local and remote (cloud) nodes to expand the capacity and integrity of the system may be provided by dynamically discovering availability from the local system of cloud blockchain system, and falling back on the local system when/if the remote/cloud system becomes unavailable (e.g., connectivity or other reason such as cloud infrastructure outage).

Figure 14C:
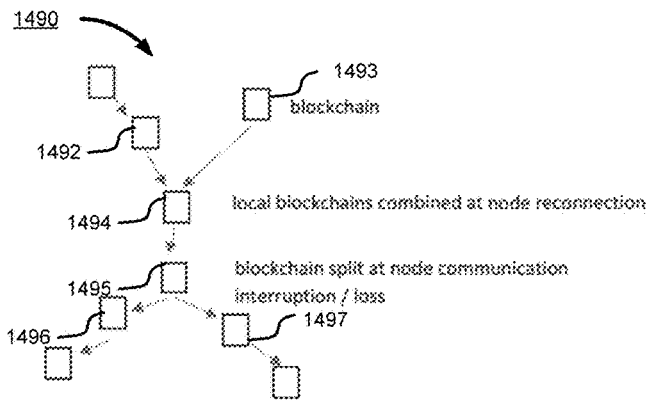
FIG. 14C illustrates the concept of splitting a blockchain in accordance with some embodiments disclosed herein.

Turning to FIG. 14C, conceptual flow 1490 traces the recombination and split of a plurality of blockchains when local and/or remote blockchain nodes reconnect or communication them is lost. In this example, blockchain branches 1492 and 1493, respectively refer to local and remotely managed branches of one blockchain ledger.

When a new event at 1494 occurs, and an inaccessible node becomes available again due to reconnection, the accessible blockchain node(s) recombine branches 1492 and 1493 with the new event into a single blockchain node 1494. In some embodiments, this corresponds to FIG. 14B 1474.

When connectivity to one or more blockchain node(s) is lost, the blockchain that was unified at 1494 may be split at 1495 to result in separate blockchain branches 1496 and 1497. In some embodiments, this corresponds to FIG. 14B 1472.

In some embodiments, the mathematical proof requirements for the local blockchains may be adjusted so that remote nodes with less computational power can add blocks to the local blockchain. For example, an adaptive algorithm may be used that adjusts the number of bits used in the algorithm based upon the capabilities of the connected nodes.

Figure 15A:
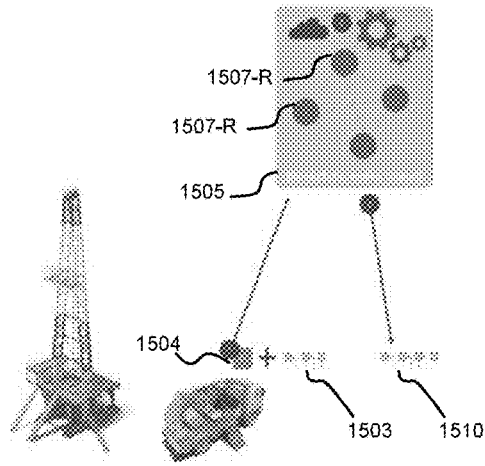
FIG. 15A illustrates a conceptual cloud-or remote-based blockchain infrastructure at a well site or rig site.

Referring to FIG. 15A, a conceptual cloud-or remote-workflow 1500 for blockchain will be discussed in the example context of a wellsite or rigsite. A blockchain ledger 1503 may be an empty or existing ledger that includes information to be trusted and tamper-proofed. A new entry 1504 that may not be secured yet may be an activity log, a decision captured by the system, or other data element. The cloud-based blockchain infrastructure 1505 includes a plurality of remote nodes 1507-R, which may include a CPU with one or more cores.

Figure 15B:
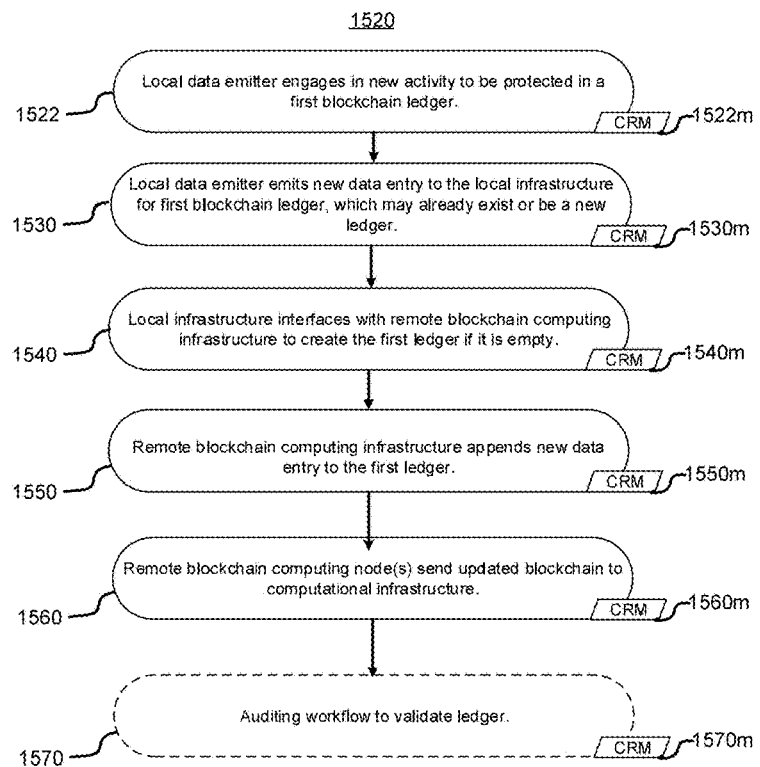
FIG. 15B illustrates a method of updating a blockchain in accordance with some embodiments disclosed herein.

In the example workflow 1520 illustrated in FIG. 15B, a new activity is captured by the system; this activity is to be appended to the blockchain secured ledger (see FIG. 15B, 1522, Local data emitter engages in new activity to be protected in a first blockchain ledger).

In operation, the new entry for the ledger is provided 1530 to the local infrastructure which interfaces the blockchain system to create and validate a new block for that entry (see FIG. 15B, 1530, Local data emitter emits new data entry to the local infrastructure for first blockchain ledger, which may already exist or be a new ledger; see, e.g., FIG. 15A 1503, 1504, and 1505).

In the example of workflow 1520, which is a remote-or cloud-based blockchain workflow, the local blockchain node(s) interface with the remote blockchain node(s) to complement the block creation for the new entry in the ledger (see FIG. 15B, 1540, Local infrastructure interfaces with remote blockchain computing infrastructure to create the first ledger if it is empty; see, e.g., FIG. 15A 1505, 1507-R).

The new block is appended 1550 to the existing ledger (or the ledger is created on this request, and the new entry is incorporated) (see FIG. 15B 1550, local computing infrastructure interfaces with remote blockchain node(s) to append new data entry to the first ledger). The blockchain system then sends 1560 back to the local infrastructure the revised first ledger 1510 (see FIG. 15B, 1560, Blockchain computing infrastructure sends revised first ledger to local computing infrastructure).

In various embodiments, the local blockchain infrastructure includes one or more of: a) physical protection so that unauthorized users cannot access the computing or network resources of that infrastructure, b) private keys used to create blocks are secured via hardware or using hardware during provisioning, and c) software protection with high security is enforced throughout the system so breaches that could alter the system are avoided.

In some embodiments, an optional auditing workflow 1570 is provided so that the ledger may be validated locally or in town using a public key (see FIG. 15B, 1570, Auditing workflow to validate ledger).

One example benefit of the described local hybrid blockchain system is that transfer proofing via an immutable ledger of transactions may be provided. Trust may be provided by a distributed (as compared to centralized) validation process. An audit trail may be provided for the site operator or third parties.

In some embodiments performed in one or more methods disclosed herein, such as the examples of methods 1100, 1300, 1450, 1520, 2000, 2100, and 2200, transfer proofing via an immutable ledger of transactions is incorporated into the method. In certain implementations of such embodiments, trust and verification operations are implemented in a distributed validation process that can be provided for review by a site operator or a third-party.

Examples of resources that can be protected include people (identity, activity, accountability), assets (financials, materials & equipment, sensitive information), and systems (operations, activity, accountability, event sequences).

In some embodiments performed in one or more methods disclosed herein, such as the examples of methods 1100, 1300, 1450, 1520, 2000, 2100, and 2200, the protection of people (identity, activity, accountability), assets (financials, materials & equipment, sensitive information), and systems (operations, activity, accountability, event sequences) is incorporated into the method.

Examples of risks that the described blockchain system embodiments can audit or mitigate against include data alteration (to inflict harm on the site operator or for other gains), lack of audibility or trust in the operator or third parties (such as by government or other oversight agencies). Examples of assets that may be valuable to protect include production information, subsurface information, operations integrity, financials & sensitive information, and security (such as data & identity).

One example advantage in the deployment of the described blockchain system in the production environment is that tampering of projected oil reserve reporting may be limited or avoided. The impact of such tampering may include information tied to the operator or government financial and asset reporting. Misinformation can lead to large liability exposures as the lack of trusted auditability of natural reserves can lead to large financial and geopolitical ramifications. The described blockchain system may avoid such misinformation by providing a secure, auditable ledger.

Accordingly, in some embodiments performed in conjunction with one or more methods disclosed herein, such as the examples of methods 1100, 1300, 1450, 1520, 2000, 2100, and 2200, a method of protecting projected oil reserve information is provided, where oil or gas reserve information is identified; the oil or gas reserve information is protected by any one of the methods 1100, 1300, 1450, 1520, 2000, 2100, or 2200, and the protected oil or gas reserve information is transmitted to an interested party.

One example advantage in the deployment of the described blockchain system in the subsurface survey environment is that tampering of seismic survey data, such as medium to high fidelity models of the subsurface, may be limited or avoided. The impact of such tampering may include affecting the strategy to develop and produce oilfield resources leading to large expenditures and loss of reputation. The described blockchain system may avoid such misinformation by providing a secure, auditable ledger.

Accordingly, in some embodiments performed in conjunction with one or more methods disclosed herein, such as the examples of methods 1100, 1300, 1450, 1520, 2000, 2100, and 2200, a method of protecting seismic survey data is provided, where seismic survey data is identified; the seismic survey data is protected by any one of the methods 1100, 1300, 1450, 1520, 2000, 2100, or 2200, and the protected seismic survey data is transmitted to an interested party.

One example advantage in the deployment of the described blockchain system in the operations integrity environment is that tampering of operation facts may be limited or avoided. The impact of such tampering may include altering the perception of actual vs expected events, such as manipulating the costs of operation by a contractor, or to manipulate accountability to void responsibility in an operation incident. The described blockchain system may avoid such misinformation by providing a secure, auditable ledger to provide trust in auditability and limit or prevent tampering of operations.

Accordingly, in some embodiments performed in conjunction with one or more methods disclosed herein, such as the examples of methods 1100, 1300, 1450, 1520, 2000, 2100, and 2200, a method of protecting operations integrity data is provided, where operations integrity data is identified; the operations integrity data is protected by any one of the methods 1100, 1300, 1450, 1520, 2000, 2100, or 2200, and the protected operations integrity data is transmitted to an interested party.

One example advantage in the deployment of the described blockchain system in the financial and sensitive information environment is that tampering of company, financial, asset, resources, or employee information facts may be limited or avoided. The impact of such tampering may include loss of reputation or other gains by individual actors or third parties to damage operator financials of image. The described blockchain system may avoid such misinformation by providing a secure, auditable ledger to provide trust in auditability and limit or prevent tampering of such information.

Accordingly, in some embodiments performed in conjunction with one or more methods disclosed herein, such as the examples of methods 1100, 1300, 1450, 1520, 2000, 2100, and 2200, a method of protecting financial and sensitive information related to energy-generation, capture, storage and transmission data is provided, where financial and sensitive energy-generation, capture, storage and transmission data is identified; the energy-generation, capture, storage and transmission data is protected by any one of the methods 1100, 1300, 1450, 1520, 2000, 2100, or 2200, and the protected financial and sensitive energy-generation, capture, storage and transmission data is transmitted to an interested party.

One example advantage in the deployment of the described blockchain system in the security environment is that tampering of access logs for sensitive information may be limited or avoided. The described blockchain system may avoid such misinformation by providing a secure, auditable ledger to provide trust in auditability and limit or prevent undesired data access, usage or manipulation and to identify the user or systems attempting such breaches.

Accordingly, in some embodiments performed in conjunction with one or more methods disclosed herein, such as the examples of methods 1100, 1300, 1450, 1520, 2000, 2100, and 2200, a method of protecting security information related to energy-generation, capture, storage and transmission data is provided, where security information related to energy-generation, capture, storage and transmission data is identified; the energy-generation, capture, storage and transmission data is protected by any one of the methods 1100, 1300, 1450, 1520, 2000, 2100, or 2200, and the protected security information energy-generation, capture, storage and transmission data is transmitted to an interested party.

In one particular example, transactions in a data lake or data ecosystem are tracked in the blockchain system to build transparency and trust in the data integrity of the system. Transactions may be reviewed by the site operator and third parties that are not tampered with by other individuals. Access logs may also be provided by the blockchain to maintain evidence of use.

Accordingly, in some embodiments performed in conjunction with one or more methods disclosed herein, such as the examples of methods 1100, 1300, 1450, 1520, 2000, 2100, and 2200, a method of protecting transactions in a data lake or data ecosystem related to energy-generation, capture, storage and transmission data is provided, where the transactions are identified; the transactions are protected by any one of the methods 1100, 1300, 1450, 1520, 2000, 2100, or 2200, and the protected transactions are transmitted to an interested party.

In a particular example in the application of winch conveyance, operators in the field may be responsible for large assets and responsible to follow operational protocols. Incidents may happen that may be operator dependent (distraction, bad decision, lack of knowledge and conformance to protocols). Events logged outside the blockchain may provide limited protection (basic Hash of log files, log files can be deleted by users, etc.). However the distributed nature of the described blockchain may provide improved data security protections.

Accordingly, in some embodiments performed in conjunction with one or more methods disclosed herein, such as the examples of methods 1100, 1300, 1450, 1520, 2000, 2100, and 2200, a method of protecting winch conveyance data is provided, where the winch conveyance data is identified; the winch conveyance data is protected by any one of the methods 1100, 1300, 1450, 1520, 2000, 2100, or 2200, and the winch conveyance data is transmitted to an interested party.

In a particular example in the application of drilling operations, operators in the field may be responsible for large assets and responsible to follow operational protocols. Incidents may happen that may be operator dependent (distraction, bad decision, lack of knowledge and conformance to protocols). Events logged outside the blockchain may provide limited protection (basic Hash of log files, log files can be deleted by users, etc.). However the distributed nature of the described blockchain may provide improved data security protections.

Accordingly, in some embodiments performed in conjunction with one or more methods disclosed herein, such as the examples of methods 1100, 1300, 1450, 1520, 2000, 2100, and 2200, a method of protecting drilling operations data is provided, where the drilling operations data is identified; the drilling operations data is protected by any one of the methods 1100, 1300, 1450, 1520, 2000, 2100, or 2200, and the drilling operations data is transmitted to an interested party.

In a particular example in the application of oil-and gas-production operations, operators in the field may be responsible for large assets and responsible to follow operational protocols. Incidents may happen that may be operator dependent (distraction, bad decision, lack of knowledge and conformance to protocols). Events logged outside the blockchain may provide limited protection (basic Hash of log files, log files can be deleted by users, etc.). However the distributed nature of the described blockchain may provide improved data security protections.

Accordingly, in some embodiments performed in conjunction with one or more methods disclosed herein, such as the examples of methods 1100, 1300, 1450, 1520, 2000, 2100, and 2200, a method of protecting oil-and gas-production operations data is provided, where the oil-and gas-production operations data is identified; the oil-and gas-production conveyance data is protected by any one of the methods 1100, 1300, 1450, 1520, 2000, 2100, or 2200, and the oil-and gas-production operations data is transmitted to an interested party.

Figure 16:
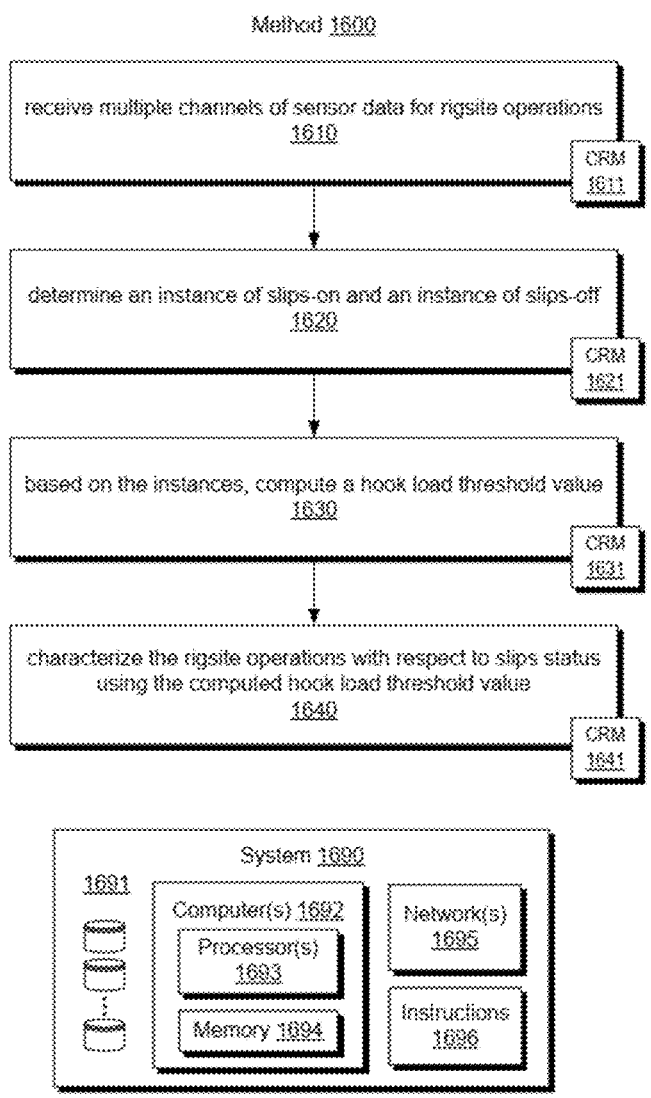
FIG. 16 illustrates an example of a method and an example of a system.

FIG. 16 shows an example of a method 1600 and an example of a system 1690. The method 1600 includes a reception block 1610 for receiving multiple channels of sensor data for rigsite operations; a determination block 1620 for determining an instance of slips-on and an instance of slips-off; a computation block 1630 for, based on the instances, computing a hook load threshold value; and a characterization block 1640 for characterizing the rigsite operations with respect to slips status using the computed hook load threshold value.

The method 1600 is shown as including various computer-readable storage medium (CRM) blocks 1611, 1621, 1631, and 1641 that can include processor-executable instructions that can instruct a computing system, which can be a control system, to perform one or more of the actions described with respect to the method 1600.

In the example of FIG. 16, a system 1690 includes one or more information storage devices 1691, one or more computers 1692, one or more networks 1695 and instructions 1696. As to the one or more computers 1692, each computer may include one or more processors (e.g., or processing cores) 1693 and memory 1694 for storing the instructions 1696, for example, executable by at least one of the one or more processors 2193 (see, e.g., the blocks 1611, 1621, 1631 and 1641). As an example, a computer may include one or more network interfaces (e.g., wired or wireless), one or more graphics cards, a display interface (e.g., wired or wireless), etc.

As an example, the method 1600 may be a workflow that can be implemented using one or more frameworks that may be within a framework environment. As an example, the system 1690 can include local and/or remote resources. For example, consider a browser application executing on a client device as being a local resource with respect to a user of the browser application and a cloud-based computing device as being a remote resources with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

Figure 17:
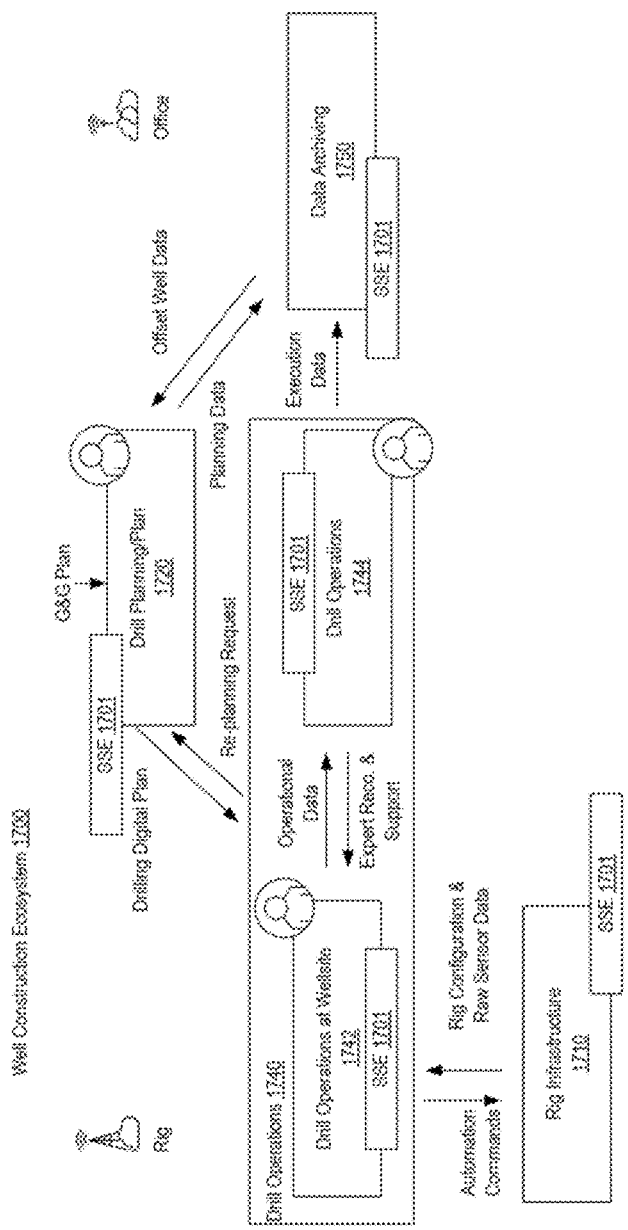
FIG. 17 illustrates an example of a well construction ecosystem that includes one or more slips status engines.

FIG. 17 shows an example of a system 1700 that can be a well construction ecosystem. As shown, the system 1700 can include one or more instances of a slips status engine (SSE) 1701 (see, e.g., the system 900 of FIG. 9, etc.) and can include a rig infrastructure 1710 and a drill plan component 1720 that can generation or otherwise transmit information associated with a plan to be executed utilizing the rig infrastructure 1710, for example, via a drilling operations layer 1740, which includes a wellsite component 1742 and an offsite component 1744. As shown, data acquired and/or generated by the drilling operations layer 1740 can be transmitted to a data archiving component 1750, which may be utilized, for example, for purposes of planning one or more operations (e.g., per the drilling plan component 1720).

As an example, a method can include receiving multiple channels of sensor data for rigsite operations; determining an instance of slips-on and an instance of slips-off; based on the instances, computing a hook load threshold value; and characterizing the rigsite operations with respect to slips status using the computed hook load threshold value. In such an example, computing can include computing a hook load threshold HKLD_CUT: (HKLD_CUT=(HKLD_MEDSlipsOn+HKLD_MEDSlipsOff)/2), where MED is the median value of a channel of hook load sensor data.

As an example, characterizing can include determining at least one state of a rig at the rigsite.

As an example, determining can include computing statistics for each of the multiple channels at a predetermined time interval. For example, consider the predetermined time interval is greater than 1 second and less than 120 seconds; the predetermined time interval is greater than 1 second and less than 60 seconds; the predetermined time interval is greater than 1 second and less than 40 seconds; or the predetermined time interval is greater than 10 second and less than 30 seconds.

As an example, a method can include determining an instance of slips-on and an instance of slips-off being performed for a predetermined time interval. For example, consider determining the instances for a plurality of intervals of the predetermined time interval.

As an example, a method can include adjusting a total depth value of a borehole to ensure that total depth of a total depth channel does not decrease.

As an example, a method can include rendering a graphic to a display that includes indicia of slips status. In such an example, the graphic can include a hook load sensor channel versus time plot that includes hook load threshold values versus time.

As an example, a hook load threshold value can change during the rigsite operations. For example, a hook load threshold value may be dynamic and may change at various points in time, for example, according to predetermined intervals of multiple channel data as analyzed.

As an example, a hook load threshold value can change responsive to maximum hook load of a hook load channel as sensed by a hook load sensor.

As an example, a method may be implemented that computes a hook load threshold value (e.g., dynamically) where a block weight is heavy compared to a drillstring, which may occur for shallow depths, particularly for offshore operations.

As an example, a system can include a processor; memory accessible by the processor; processor-executable instructions stored in the memory and executable to instruct the system to: receive multiple channels of sensor data for rigsite operations; determine an instance of slips-on and an instance of slips-off; based on the instances, compute a hook load threshold value; and characterize the rigsite operations with respect to slips status using the computed hook load threshold value.

As an example, one or more computer-readable storage media can include processor-executable instructions to instruct a computing system to: receive multiple channels of sensor data for rigsite operations; determine an instance of slips-on and an instance of slips-off; based on the instances, compute a hook load threshold value; and characterize the rigsite operations with respect to slips status using the computed hook load threshold value.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 18:
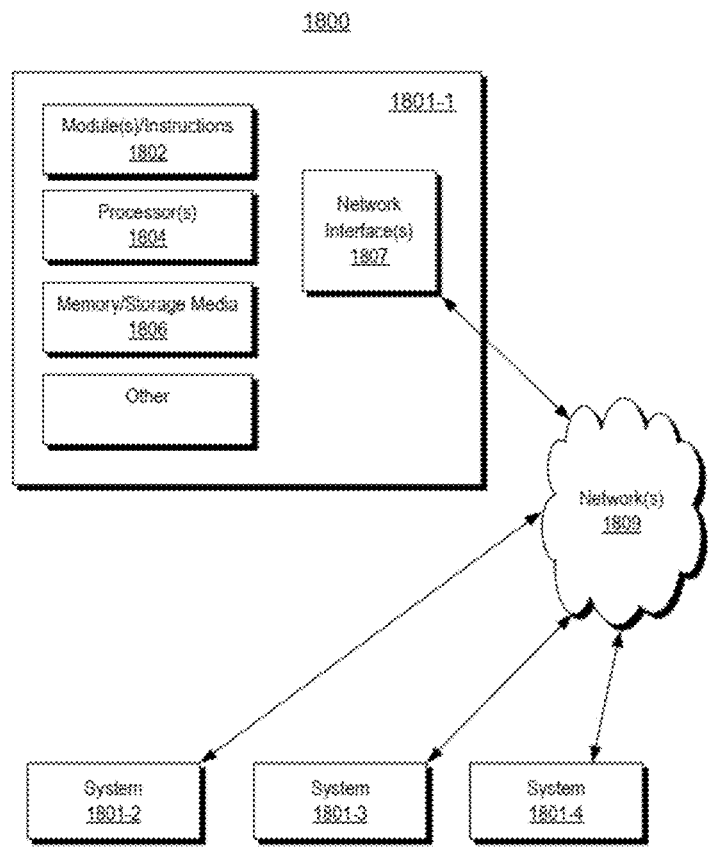
FIG. 18 illustrates an example of computing system.

In some embodiments, a method or methods may be executed by a computing system. FIG. 18 shows an example of a system 1800 that can include one or more computing systems 1801-1, 1801-2, 1801-3 and 1801-4, which may be operatively coupled via one or more networks 1809, which may include wired and/or wireless networks.

As an example, a system can include an individual computer system or an arrangement of distributed computer systems. In the example of FIG. 18, the computer system 1801-1 can include one or more modules 1802, which may be or include processor-executable instructions, for example, executable to perform various tasks (e.g., receiving information, requesting information, processing information, simulation, outputting information, etc.).

As an example, a module may be executed independently, or in coordination with, one or more processors 1804, which is (or are) operatively coupled to one or more storage media 1806 (e.g., via wire, wirelessly, etc.). As an example, one or more of the one or more processors 1804 can be operatively coupled to at least one of one or more network interface 1807. In such an example, the computer system 1801-1 can transmit and/or receive information, for example, via the one or more networks 1809 (e.g., consider one or more of the Internet, a private network, a cellular network, a satellite network, etc.).

As an example, the computer system 1801-1 may receive from and/or transmit information to one or more other devices, which may be or include, for example, one or more of the computer systems 1801-2, etc. A device may be located in a physical location that differs from that of the computer system 1801-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1806 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 19:
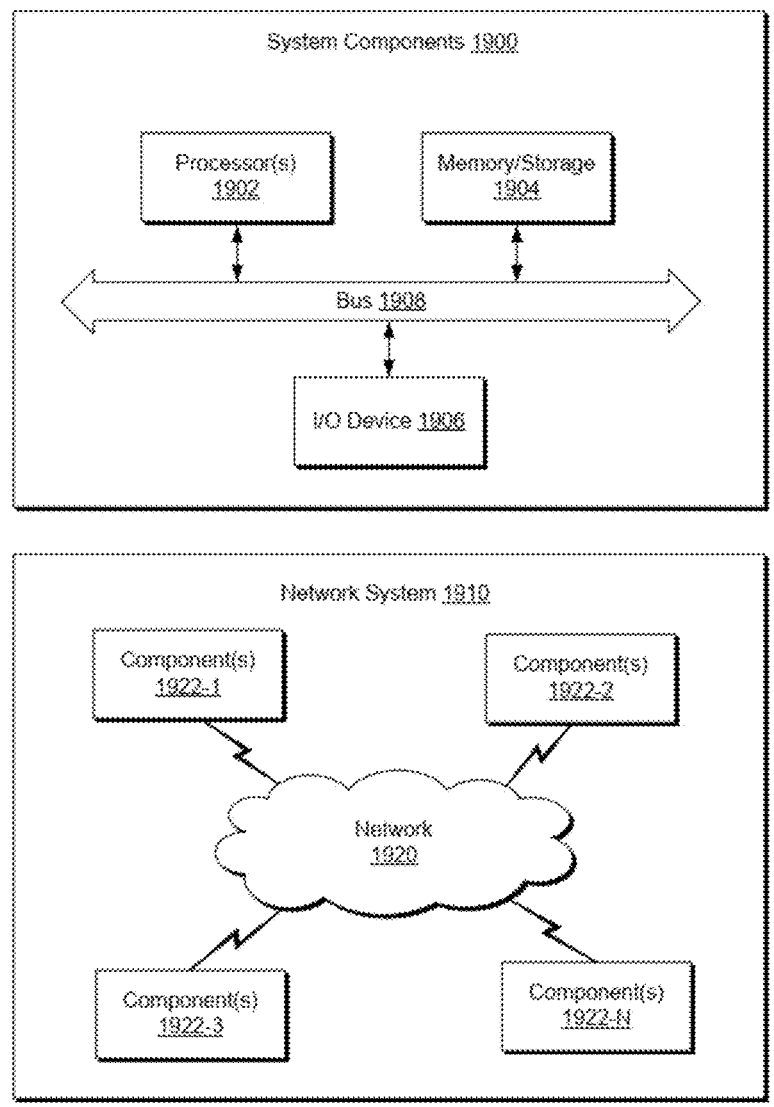
FIG. 19 illustrates example components of a system and a networked system.

FIG. 19 shows components of a computing system 1900 and a networked system 1910. The system 1900 includes one or more processors 1902, memory and/or storage components 1904, one or more input and/or output devices 1906 and a bus 1908. According to an embodiment, instructions may be stored in one or more computer-readable media (e.g., memory/storage components 1904). Such instructions may be read by one or more processors (e.g., the processor(s) 1902) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 1906). According to an embodiment, a computer-readable medium may be a storage component such as a physical memory storage device, for example, a chip, a chip on a package, a memory card, etc.

According to an embodiment, components may be distributed, such as in the network system 1910. The network system 1910 includes components 1922-1, 1922-2, 1922-3, . . . 1922-N. For example, the components 1922-1 may include the processor(s) 1902 while the component(s) 1922-3 may include memory accessible by the processor(s) 1902. Further, the component(s) 1922-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed.

As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Figure 20:
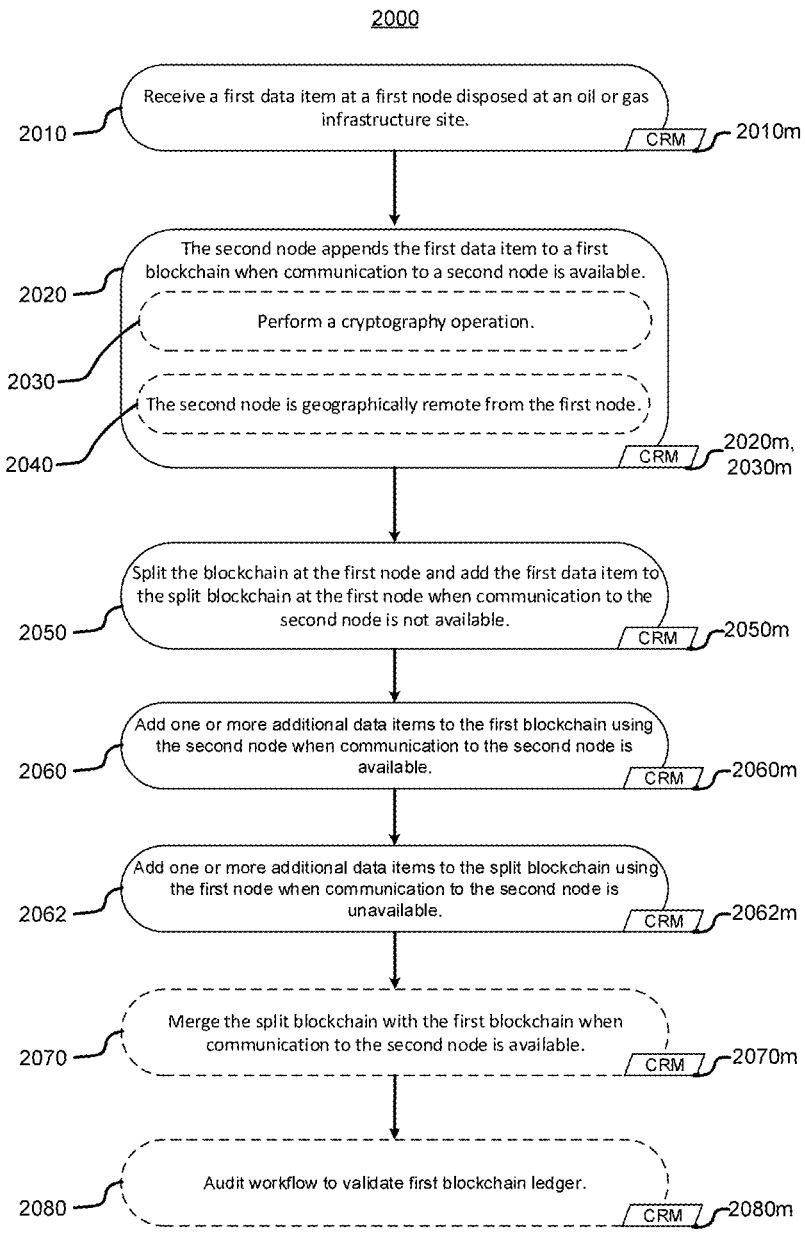
FIG. 20 illustrates a method of updating a blockchain in accordance with some embodiments disclosed herein.

Turning to FIG. 20, method 2000 for managing oil-or gas-related data emitted at an oil or gas-related location by using blockchain is discussed.

The method 2000 includes receiving 2010 a first data item at a first node disposed at an oil or gas infrastructure site (see also, e.g., FIGS. 11, 13A, 14A, 14B, 15A, 15B).

At times, communications from remote sites, such as oil-and gas-related locations in the field, can be intermittent. Accordingly, the method 2000 includes appending 2020 by a second node the first data item to a first blockchain when communication to a second node is available (see also, e.g., FIGS. 11, 13A, 14A, 14B, 15A, 15B).

In some embodiments, the method 2000 includes appending 2030 the first data item to the first blockchain includes performing a cryptography operation.

In some embodiments, the second node is geographically remote from the first node (See FIG. 20 2040; see also, e.g., FIGS. 12, 14A, 14B, 15A, 15B).

Following on with the problem of addressing intermittent communications from remote oil-and gas-related sites, the method 2000 includes, when communication to the second node is not available, splitting 2050 the blockchain at the first node and adding the first data item to the split blockchain at the first node (See FIG. 20 2050; see also, e.g., FIGS. 14A, 14B, 14C, 15A, 15B).

In some embodiments, the method 2000 includes adding 2060 one or more additional data items to the first blockchain using the second node when communication to the second node is available. (See FIG. 20 2060; see also, e.g., FIGS. 14A, 14B, 14C, 15A, 15B) In such embodiments, the method 2000 also includes adding 2062 one or more additional data items to the split blockchain using the first node when communication to the second node is unavailable. (See FIG. 20 2062; see also, e.g., FIGS. 14A, 14B, 14C, 15A, 15B).

In some embodiments, the method 2000 includes merging 2070 the split blockchain with the first blockchain when communication to the second node is available (See FIG. 20 2070; see also, e.g., FIGS. 14A, 14B, 14C, 15A, 15B).

In some embodiments, the method 2000 includes auditing 2080 the first blockchain ledger (See FIG. 20 2080).

Figure 21:
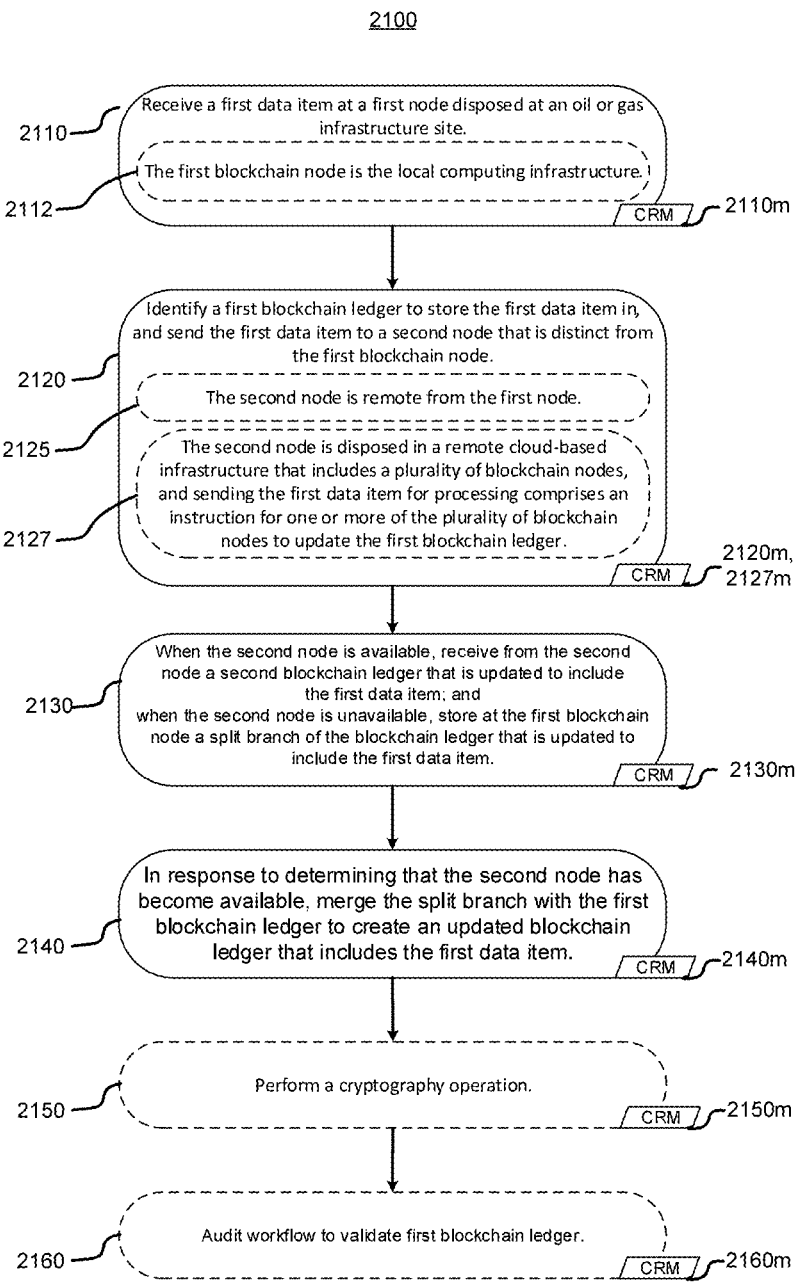
FIG. 21 illustrates a method of updating a blockchain in accordance with some embodiments disclosed herein.

Turning to FIG. 21, method 2100 relates to storing energy-related data emitted at an energy-related location using blockchain.

Method 2100 is performed at a local computing infrastructure at the energy-related location, where the local infrastructure includes a first blockchain node that receives 2110 a first data item from a data emitter at the first blockchain node. (See FIG. 21 2110; see also e.g., FIGS. 11, 13A, 14A, 14B, 15A, 15B)

In some embodiments, the first blockchain node is the local computing infrastructure (See FIG. 21 2112).

At times, communications from remote sites, such as energy-related locations in the field, can be intermittent. Method 2100 and other embodiments described herein help address those issues while assisting with maintaining data integrity.

Method 2100 includes, at the first blockchain node, identifying 2120 a first blockchain ledger to store the first data item in, and sending the first data item for the first blockchain ledger to a second node that is distinct from the first blockchain node. (See FIG. 21 2120; see also e.g., Figs.11, 12, 13A, 13B, 14A, 14B, 15A, 15B).

In some embodiments, the second node is remote from the first blockchain node (See FIG. 21 2125; see also e.g., FIGS. 11, 12, 13A, 13B, 14A, 14B, 15A, 15B).

In some embodiments, the second node is disposed in a remote cloud-based infrastructure that includes a plurality of blockchain nodes, and sending the first data item for processing comprises an instruction for one or more of the plurality of blockchain nodes to update the first blockchain ledger. (See FIG. 21 2127; see also, e.g., FIGS. 11, 12, 13A, 13B, 14A, 14B, 15A, 15B, including FIG. 13A, 1320 where multiple nodes build a consensus regarding the record).

Following on with the problem of addressing intermittent communications from remote energy-related sites, method 2100 includes that when the second node is available, a second blockchain ledger is updated to include the first data item, and the first blockchain node receives the second blockchain ledger from the second node. Contrariwise, when the second node is unavailable, store at the first blockchain node a split branch of the blockchain ledger that is updated to include the first data item. (See FIG. 21 2130; see also, e.g., FIGS. 14A, 14B, 14C, 15A, 15B).

In some embodiments, in response to determining that the second node has become available, the second node merges the split branch with the first blockchain ledger to create an updated blockchain ledger that includes the first data item. (See FIG. 21 2140; see also, e.g., FIGS. 14A, 14B, 14C, 15A, 15B).

In some embodiments, a cryptography operation is performed on a blockchain ledger. (See FIG. 21 2150). For example, when updating the first blockchain ledger as discussed above at 2120, cryptography may also be employed.

In some embodiments, the updated blockchain ledger is audited. (See FIG. 21 2160).

Figure 22:
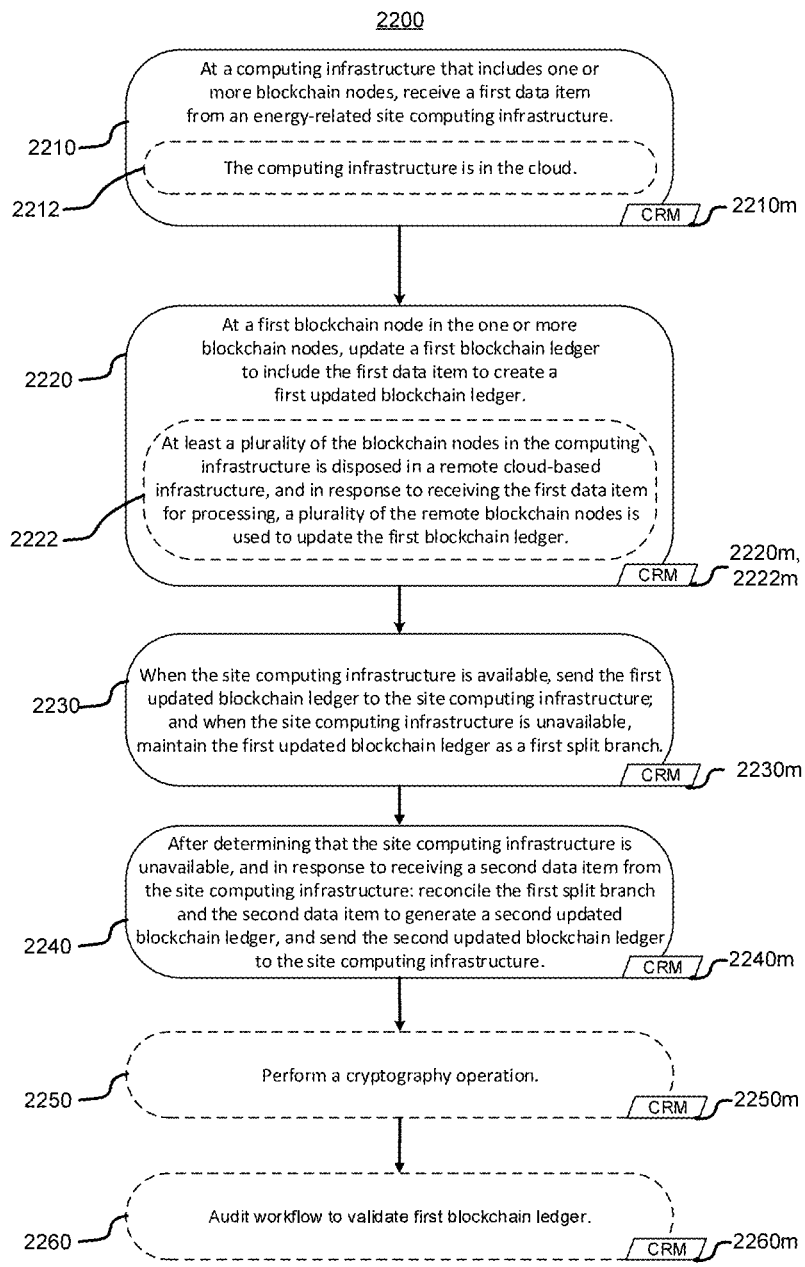
FIG. 22 illustrates a method of updating a blockchain in accordance with some embodiments disclosed herein.

Turning to FIG. 22, method 2200 relates to storing energy-related data emitted at an energy-related location using blockchain, and the energy-related location will include site computing infrastructure. Method 2200 is performed with a computing infrastructure that includes one or more blockchain nodes (see e.g., FIGS. 11, 12, 13B, 14A, 14B, 14C, 15A, 15B).

Method 2200 includes receiving at the computing infrastructure 2210 a first data item from the site computing infrastructure. (see FIG. 22 2210, see also, e.g., FIGS. 11, 12, 13B, 14A, 14B, 15A, 15B). In some embodiments, the computing infrastructure is in the cloud (see FIG. 22 2212; see also, e.g., FIGS. 12, 13A, 13B, 14A, 14B, 15A, 15B).

Method 2200 includes, at a first blockchain node in the one or more blockchain nodes, updating 2220 a first blockchain ledger to include the first data item to create a first updated blockchain ledger. (see FIG. 22 2220; see also, e.g., FIGS. 11, 12, 13A, 13B, 14A, 14B, 15A, 15B)

In some embodiments, at least a plurality of the blockchain nodes in the computing infrastructure is disposed in a remote cloud-based infrastructure, and in response to receiving the first data item for processing, a plurality of the remote blockchain nodes is used to update the first blockchain ledger (see FIG. 22 2222; see also, e.g., FIGS. 11, 12, 13A, 13B, 14A, 14B, 15A, 15B, including FIG. 13A, 1320 where multiple nodes build a consensus regarding the record).

At times, communications from remote sites, such as energy-related locations in the field, can be intermittent. Method 2200 and other embodiments described herein help address those issues while assisting with maintaining data integrity.

When the site computing infrastructure is available, method 2200 includes sending the first updated blockchain ledger to the site computing infrastructure; but when the site computing infrastructure is unavailable, method 2200 includes maintaining the first updated blockchain ledger as a first split branch. (See FIG. 22 2230; see also, e.g., FIGS. 14A, 14B, 14C, 15A, 15B).

Following on with the problem of addressing intermittent communications from remote energy-related sites, after determining that the site computing infrastructure is unavailable, and in response to later receiving a second data item from the site computing infrastructure (which indicates that the site computing infrastructure is again in communication with the computing infrastructure): reconciling the first split branch and the second data item to generate a second updated blockchain ledger, and sending the second updated blockchain ledger to the site computing infrastructure. (See FIG. 22 2240; see also, e.g., FIGS. 14A, 14B, 14C, 15A, 15B).

In some embodiments, a cryptography operation is performed on a blockchain ledger. (See FIG. 21 2150.) For example, when updating the first blockchain ledger as discussed above at 2220, cryptography may also be employed.

In some embodiments, the updated blockchain ledger is audited. (See FIG. 21 2160).

In some embodiments that practice methods 2100 and 2200, the stored energy-related data includes one or more data types selected from the group consisting of oil & gas applications, solar power applications, nuclear power application, hydroelectric power applications, wind power applications, tidal, current, and wave power applications, geothermal power applications, and power storage, generation, and transmission applications.

Those with skill in the art will appreciate that the workflows described above, including methods 1100, 1300, 1450, 1520, 2000, 2100, and 2200 may be practiced in many environments, including without limitation oil & gas applications in which the described blockchain infrastructure may be deployed include wireline operations, drilling and well construction operations, and production facility and testing operations as well as other energy generation, capture, and transmission environments in which the described blockchain infrastructure may be deployed include solar power installations, nuclear power plants, electrical transmission lines and grids, hydroelectric power plants and infrastructure, tidal, current, and wave energy installations, geothermal power sites, wind energy sites, and other power generation facilities along with their grids, instrumentation, transmission lines, and sensors that have data emitting capabilities where the data emitted may be collected and managed with block chain technologies.

Moreover, methods 1100, 1300, 1450, 1520, 2000, 2100, and 2200 are shown as including various computer-readable storage medium (CRM) blocks 1105m, 1110m, 1115m, 1120m, 1125m, 1305m, 1310m, 1315m, 1320m, 1325m, 1455m, 1460m, 1465m, 1470m, 1472m, 1474m, 1475m, 1480m, 1522m, 1530m, 1540m, 1550m, 1560m, 1570m, 2010m, 2020m, 2030m, 2050m, 2060m, 2062m, 2070m, 2080m, 2110m, 2120m, 2127m, 2130m, 2140m, 2150m, 2160m, 2210m, 2220m, 2222m, 2230m, 2240m, 2250m, and 2260m that can include processor-executable instructions that can instruct a computing system, which can be a control system, to perform one or more of the actions described with respect to their respective methods.

According to some embodiments, a method is provided for protecting winch conveyance data using blockchain, wherein the winch conveyance location includes site computing infrastructure, the method comprising at a computing infrastructure that includes one or more blockchain nodes: receiving a first data item from the site computing infrastructure; and at a first blockchain node in the one or more blockchain nodes: updating a first blockchain ledger to include the first data item to create a first updated blockchain ledger; when the site computing infrastructure is available, sending the first updated blockchain ledger to the site computing infrastructure; when the site computing infrastructure is unavailable, maintaining the first updated blockchain ledger as a first split branch; and after determining that the site computing infrastructure is unavailable, and in response to receiving a second data item from the site computing infrastructure: reconciling the first split branch and the second data item to generate a second updated blockchain ledger; and sending the second updated blockchain ledger to the site computing infrastructure. In additional embodiments, at least a plurality of the blockchain nodes in the computing infrastructure is disposed in a remote cloud-based infrastructure, and in response to receiving the first data item for processing, using a plurality of the remote blockchain nodes to update the first blockchain ledger. In additional embodiments, the first updated blockchain ledger is audited. In additional embodiments, updating the first blockchain ledger includes performing a cryptography operation.

According to some embodiments, a method is provided for protecting drilling operations data using blockchain, wherein the drilling operations location includes site computing infrastructure, the method comprising at a computing infrastructure that includes one or more blockchain nodes: receiving a first data item from the site computing infrastructure; and at a first blockchain node in the one or more blockchain nodes: updating a first blockchain ledger to include the first data item to create a first updated blockchain ledger; when the site computing infrastructure is available, sending the first updated blockchain ledger to the site computing infrastructure; when the site computing infrastructure is unavailable, maintaining the first updated blockchain ledger as a first split branch; and after determining that the site computing infrastructure is unavailable, and in response to receiving a second data item from the site computing infrastructure: reconciling the first split branch and the second data item to generate a second updated blockchain ledger; and sending the second updated blockchain ledger to the site computing infrastructure. In additional embodiments, at least a plurality of the blockchain nodes in the computing infrastructure is disposed in a remote cloud-based infrastructure, and in response to receiving the first data item for processing, using a plurality of the remote blockchain nodes to update the first blockchain ledger. In additional embodiments, the first updated blockchain ledger is audited. In additional embodiments, updating the first blockchain ledger includes performing a cryptography operation.

According to some embodiments, a method is provided for protecting oil- and gas-production operations data using blockchain, wherein the oil-and gas-production operations location includes site computing infrastructure, the method comprising at a computing infrastructure that includes one or more blockchain nodes: receiving a first data item from the site computing infrastructure; and at a first blockchain node in the one or more blockchain nodes: updating a first blockchain ledger to include the first data item to create a first updated blockchain ledger; when the site computing infrastructure is available, sending the first updated blockchain ledger to the site computing infrastructure; when the site computing infrastructure is unavailable, maintaining the first updated blockchain ledger as a first split branch; and after determining that the site computing infrastructure is unavailable, and in response to receiving a second data item from the site computing infrastructure: reconciling the first split branch and the second data item to generate a second updated blockchain ledger; and sending the second updated blockchain ledger to the site computing infrastructure. In additional embodiments, at least a plurality of the blockchain nodes in the computing infrastructure is disposed in a remote cloud-based infrastructure, and in response to receiving the first data item for processing, using a plurality of the remote blockchain nodes to update the first blockchain ledger. In additional embodiments, the first updated blockchain ledger is audited. In additional embodiments, updating the first blockchain ledger includes performing a cryptography operation.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 or any laws or rules promulgated to address or interpret functional claiming techniques for any limitations of any of the claims herein, except for those in which the claim expressly uses the words "means for" together with an associated function.

What is claimed is:

1. A method comprising:
generating field operations data at a wellsite;
performing an assessment of capabilities of connected computational nodes, wherein the connected computational nodes comprise one or more of local computational nodes at the wellsite and remote computational nodes not at the wellsite;
adjusting a number of bits utilized in a cryptographic consensus building process amongst the connected computational nodes based at least in part on the assessment; and
responsive to building of a consensus amongst the connected computational nodes, adding a cryptographically secured block, that incorporates the field operations data, to a blockchain to generate an updated blockchain.

2. The method of claim 1, wherein the field operations data comprise activity log data for activities performed at the wellsite.

3. The method of claim 1, wherein, the connected computational nodes comprise operational computational nodes.

4. The method of claim 1, comprising identifying one or more failures within the local computational nodes, the remote computational nodes, or the local computational nodes and the remote computational nodes to determine the connected computational nodes.

5. The method of claim 4, wherein the one or more failures comprise an internode communication failure.

6. The method of claim 4, wherein the one or more failures comprise a node operational failure.

7. The method of claim 1, comprising transmitting the updated blockchain to one or more computational nodes not within the connected computational nodes.

8. The method of claim 7, wherein the transmitting occurs responsive to establishing communication between one or more of the connected computational nodes and the one or more computational nodes not within the connected computational nodes.

9. The method of claim 7, comprising replacing an existing blockchain stored by the one or more computational nodes, not within the connected computational nodes, with the updated blockchain.

10. The method of claim 1, wherein the cryptographic consensus building process comprises meeting specified proof requirements.

11. The method of claim 10, wherein the proof requirements are associated with computational cryptographic operations.

12. The method of claim 1, wherein the field operations data comprise sensor data.

13. The method of claim 1, wherein the field operations data comprise slips status data for slips at the wellsite.

14. The method of claim 1, wherein the field operations data comprise hook load data for a rig system at the wellsite.

15. The method of claim 1, wherein the field operations data comprise energy data.

16. The method of claim 1, wherein the field operations data comprise wireline operations data.

17. The method of claim 1, comprising dynamically discovering node availability to determine the connected computational nodes.

18. The method of claim 17, wherein the performing of the assessment occurs responsive to the dynamically discovering.

19. A system comprising:
processor-based computational nodes that comprise local computational nodes at a wellsite and remote computational nodes not at the wellsite; and
processor-executable instructions, stored in one or more memories associated with one or more of the computational nodes, executable to instruct the system to:
perform an assessment of capabilities of the processor-based computational nodes that are operational and connected;
adjust a number of bits utilized in a cryptographic consensus building process amongst the processor-based computational nodes that are operational and connected based at least in part on the assessment; and
responsive to building of a consensus amongst the processor-based computational nodes that are operational and connected, add a cryptographically secured block, that incorporates field operations data of the wellsite, to a blockchain to generate an updated blockchain.

20. One or more non-transitory computer-readable media that comprise processor-executable instructions to instruct a computing system to:
perform an assessment of capabilities of connected computational nodes, wherein the connected computational nodes comprise one or more of local computational nodes at the wellsite and remote computational nodes not at the wellsite;
adjust a number of bits utilized in a cryptographic consensus building process amongst the connected computational nodes based at least in part on the assessment; and
responsive to building of a consensus amongst the connected computational nodes, add a cryptographically secured block, that incorporates field operations data of the wellsite, to a blockchain to generate an updated blockchain.

* * * * *